Nov. 5, 1929.  H. J. BAUR ET AL  1,734,283
ZONE FARE SYSTEM
Filed July 10, 1920  19 Sheets-Sheet 1
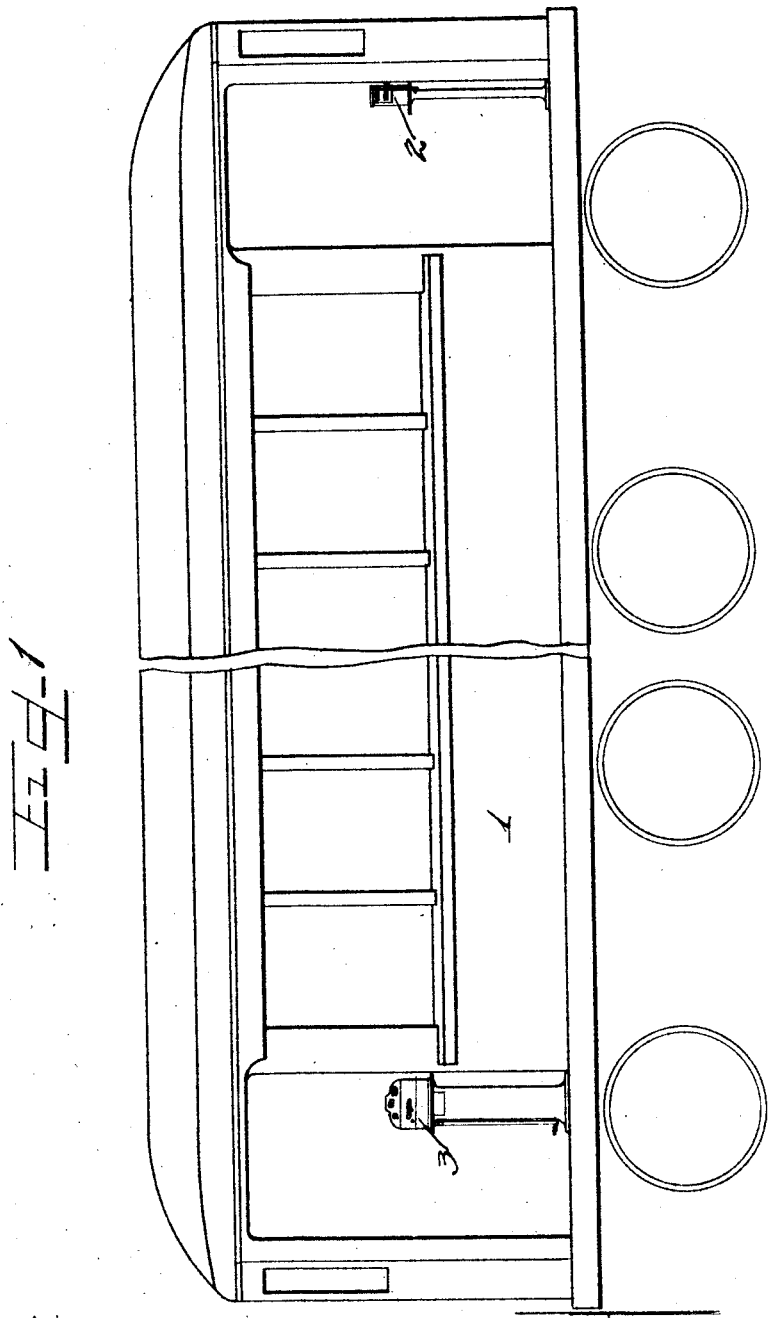
Witnesses
J.W. Angell
Charles W Hill Jr.
Inventors
Hugo J. Baur
Ernest H. Thompson
by Charles W Hill Atty.

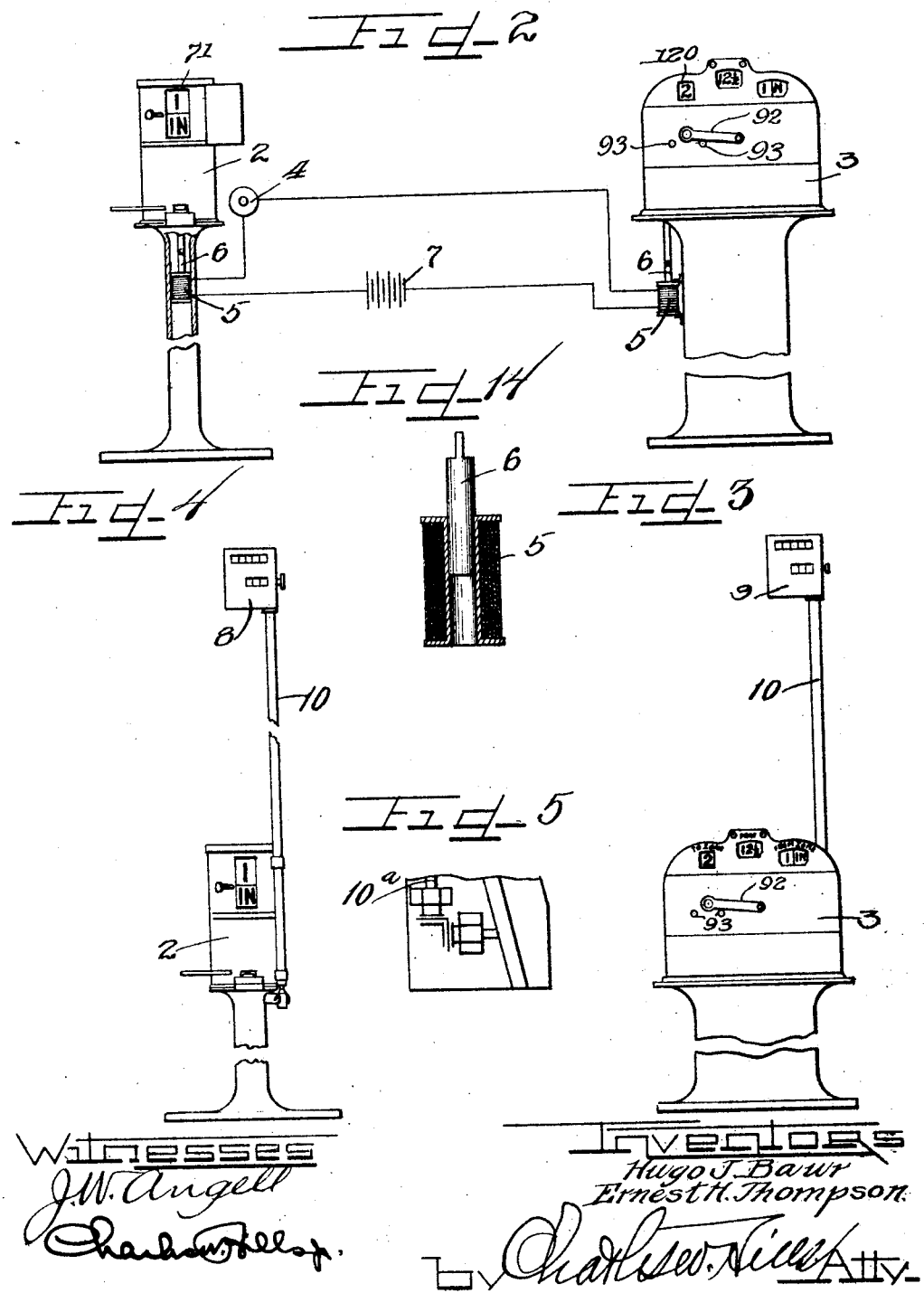

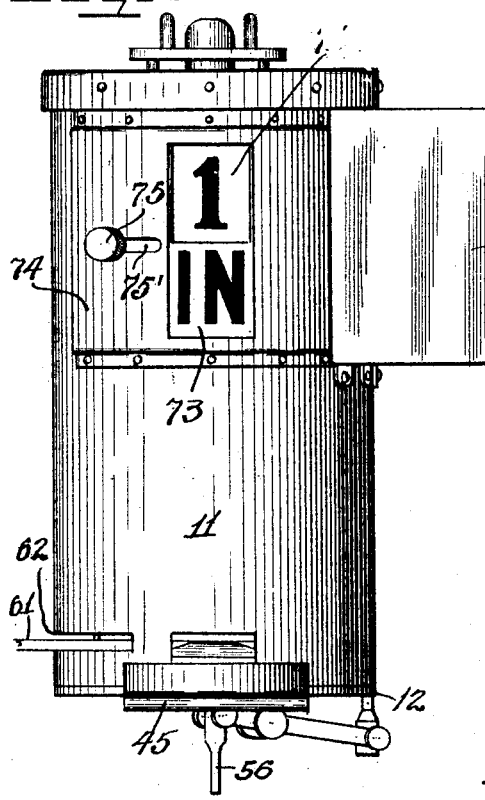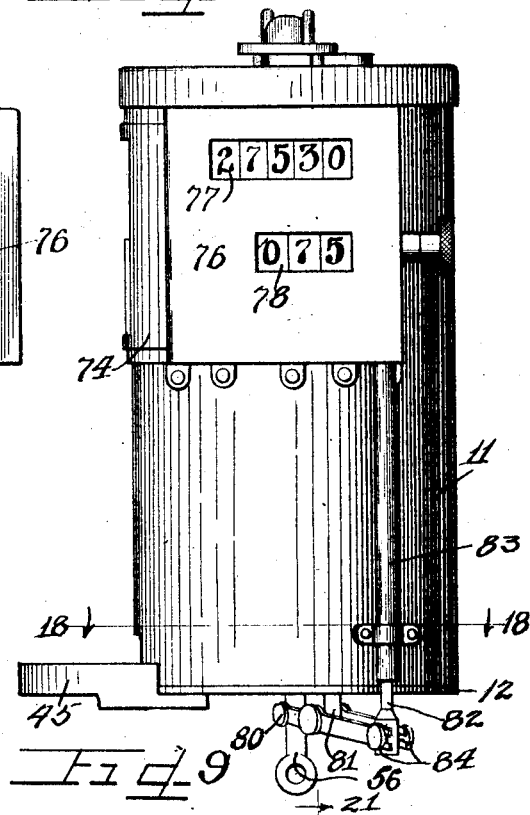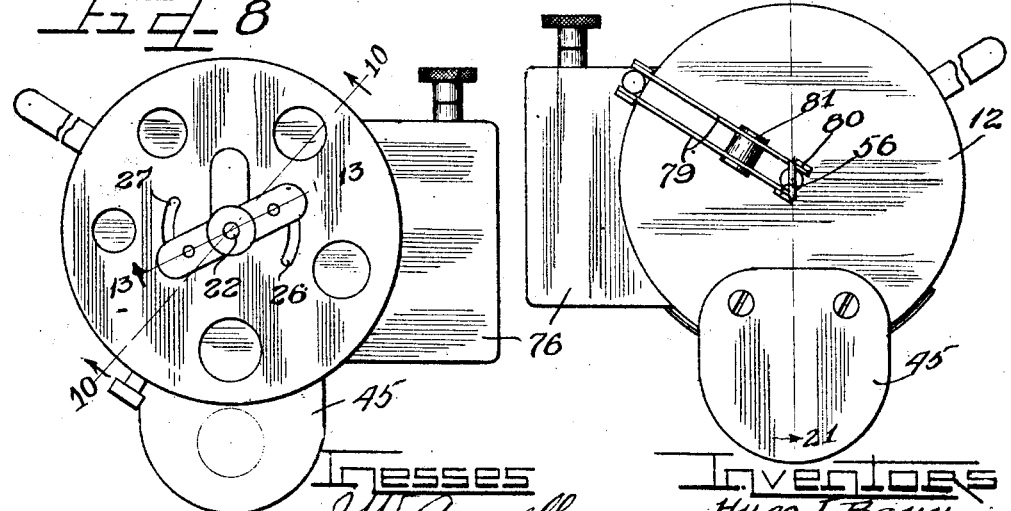

Nov. 5, 1929.　　　H. J. BAUR ET AL　　　1,734,283
ZONE FARE SYSTEM
Filed July 10, 1920　　19 Sheets-Sheet 4
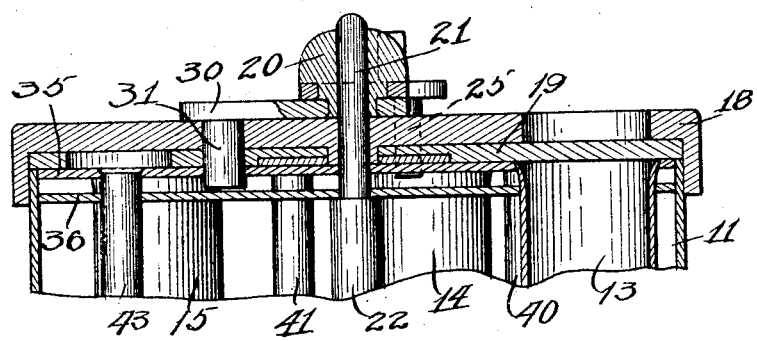
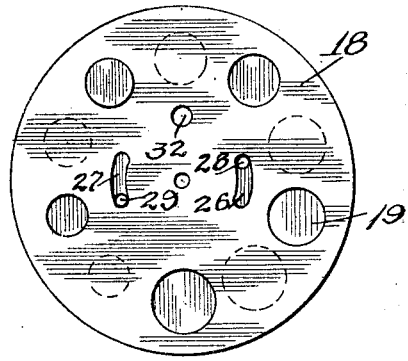 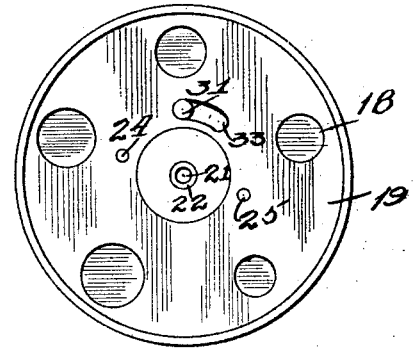
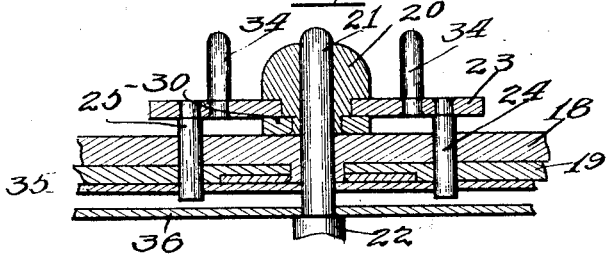

Nov. 5, 1929.  H. J. BAUR ET AL  1,734,283
ZONE FARE SYSTEM
Filed July 10, 1920    19 Sheets-Sheet 5
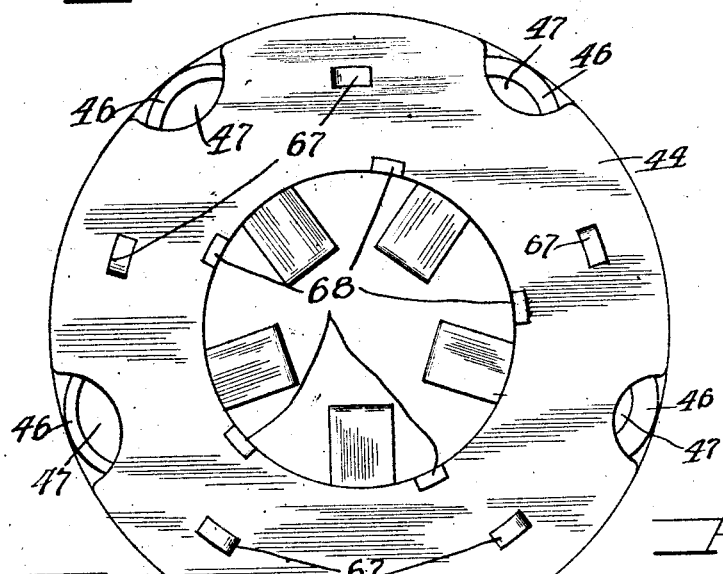
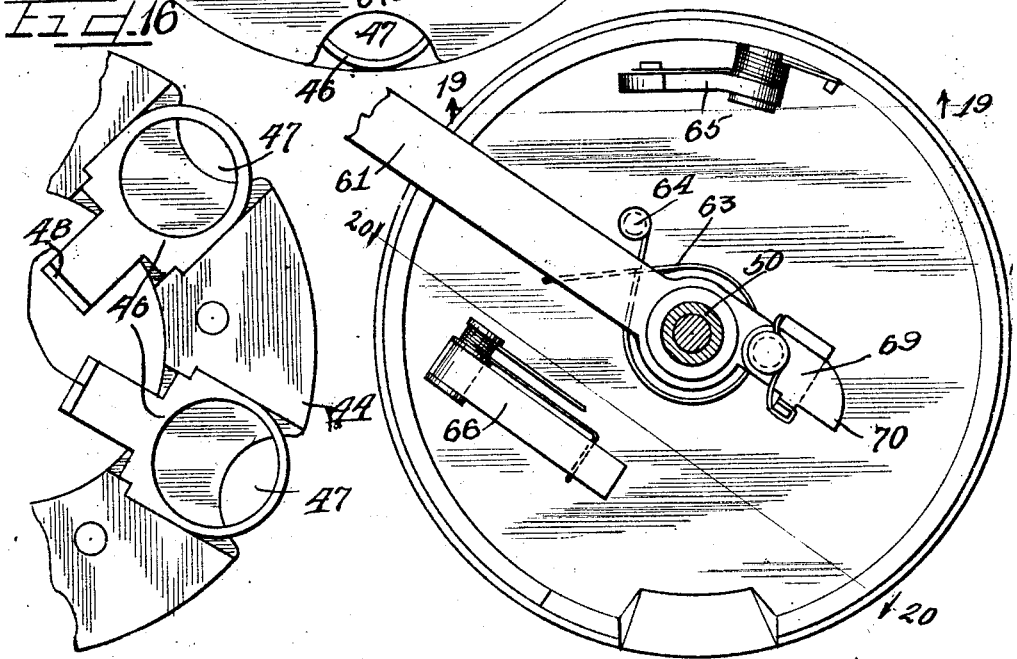

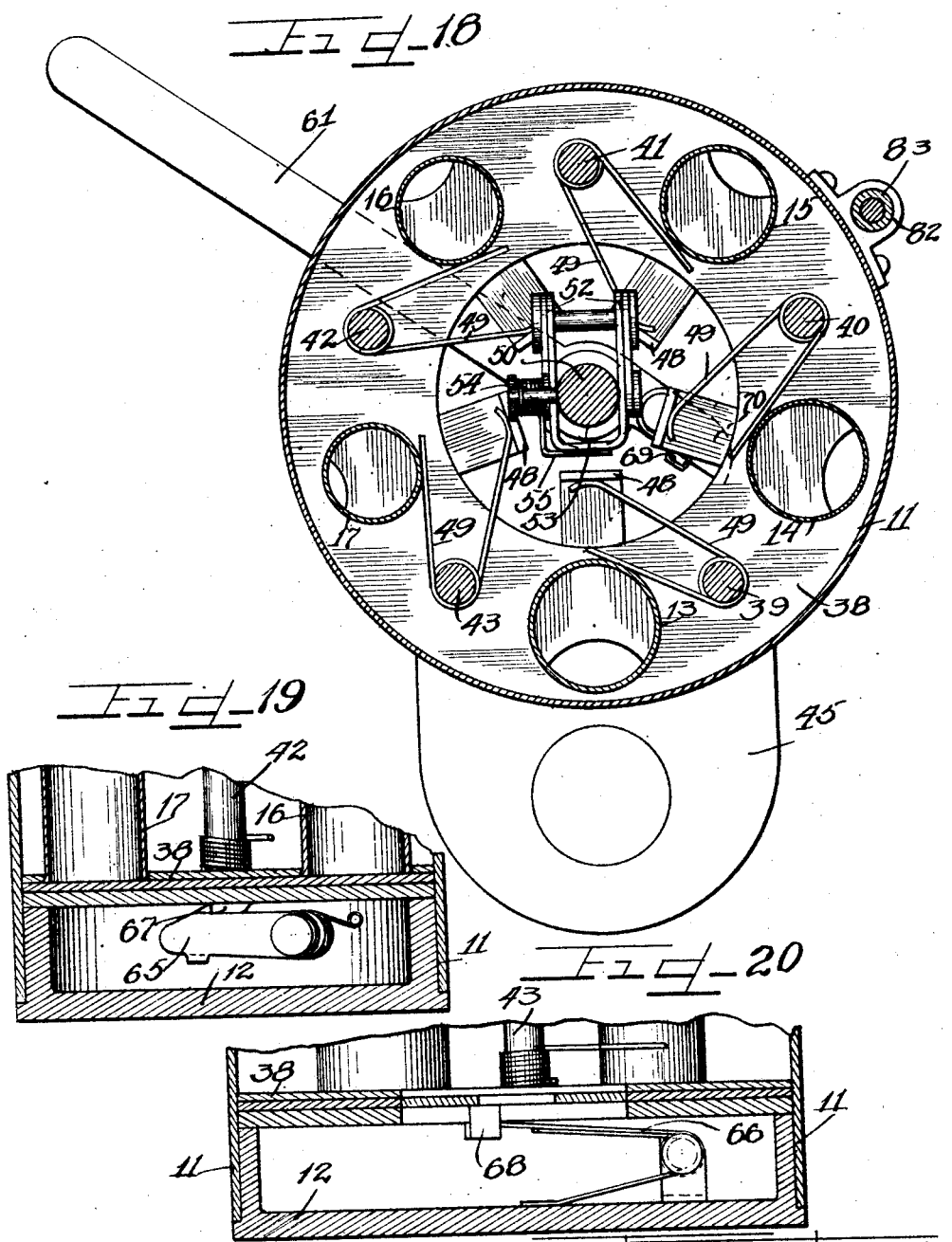

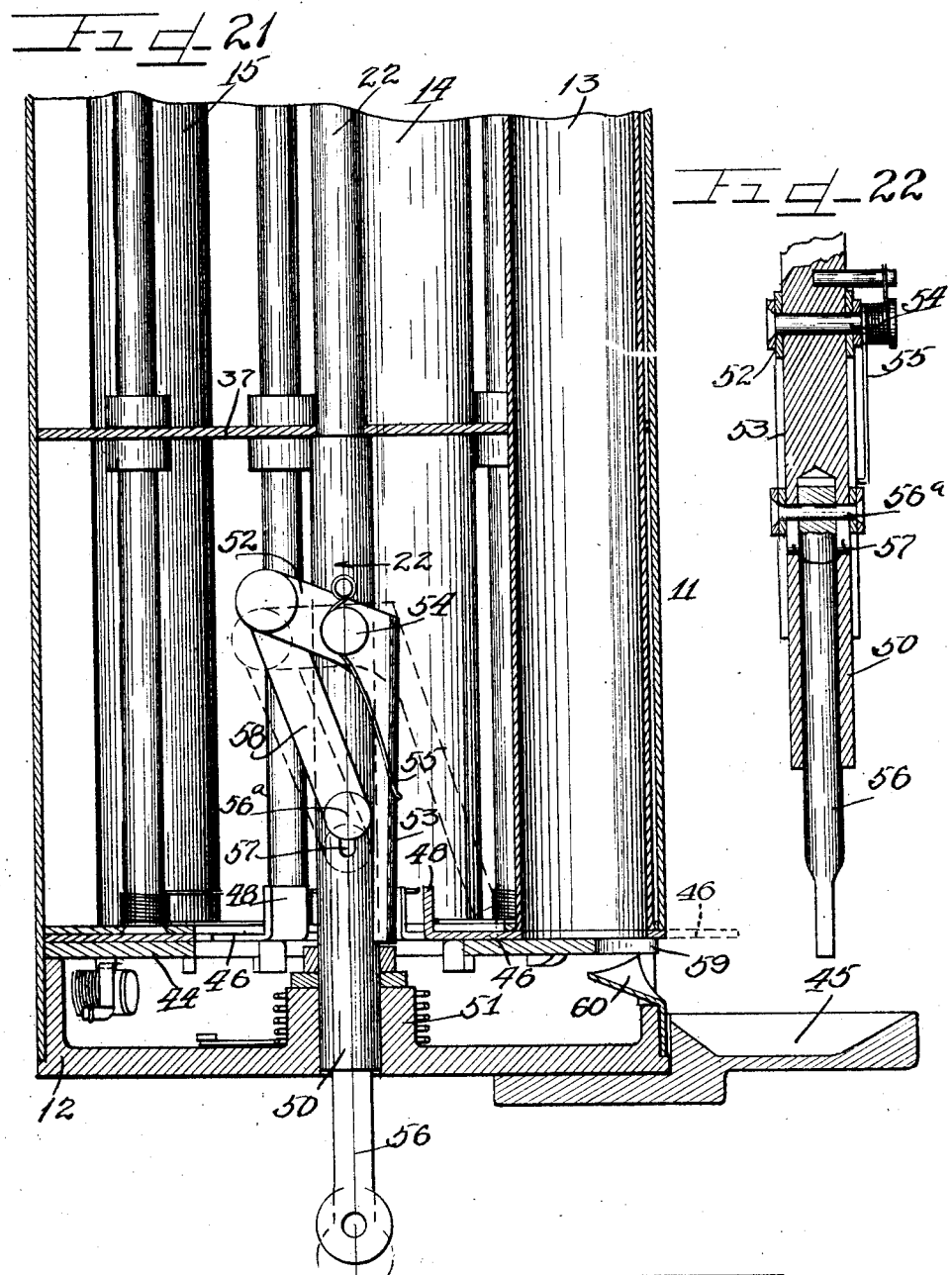

Nov. 5, 1929.   H. J. BAUR ET AL   1,734,283
ZONE FARE SYSTEM
Filed July 10, 1920   19 Sheets-Sheet 8
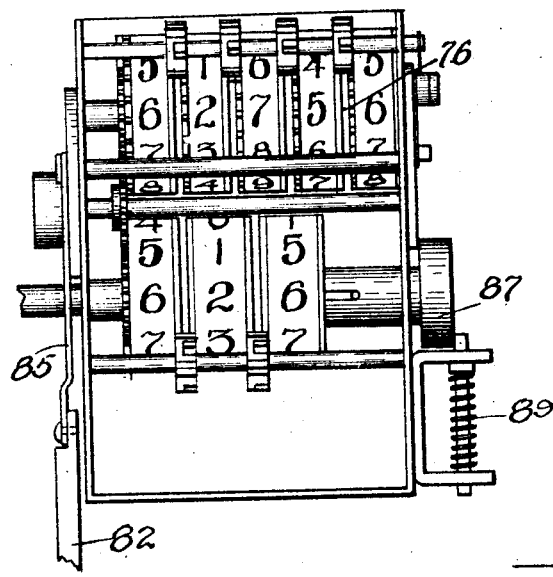
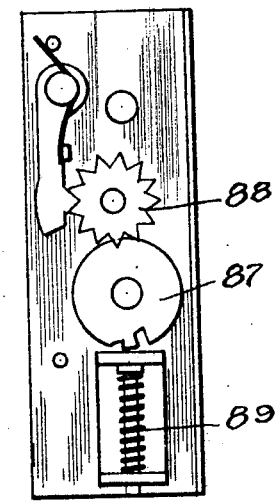
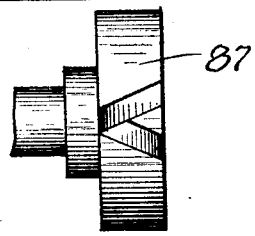
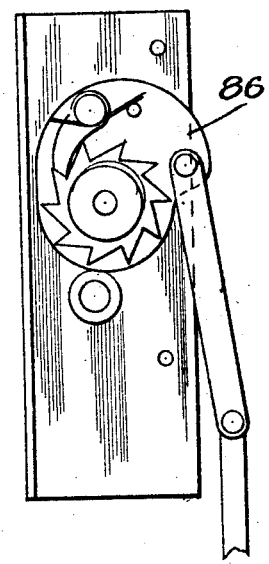

Nov. 5, 1929.    H. J. BAUR ET AL    1,734,283
ZONE FARE SYSTEM
Filed July 10, 1920    19 Sheets-Sheet 9
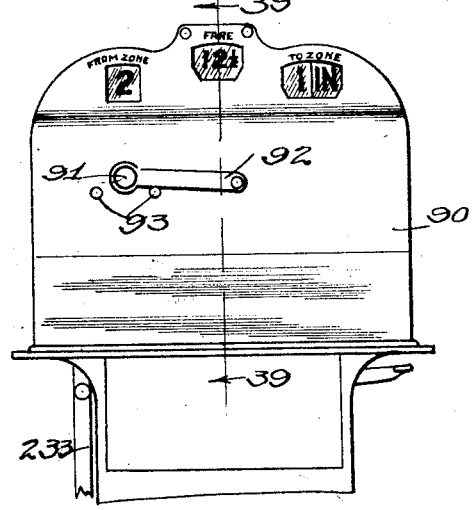
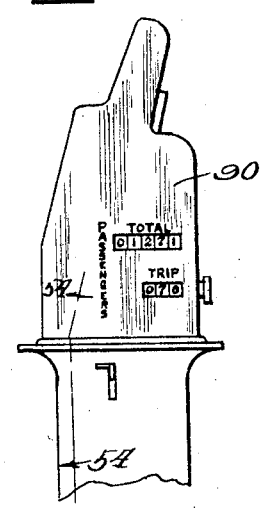
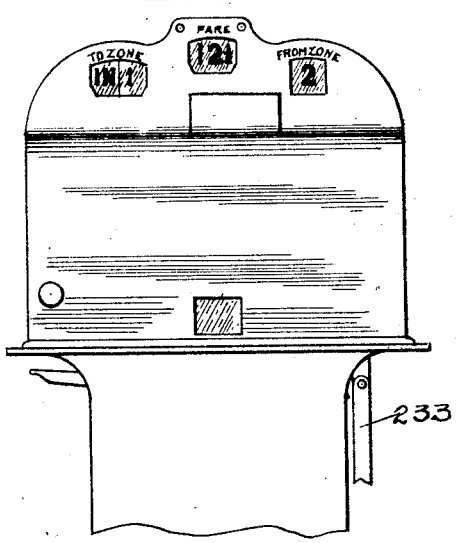
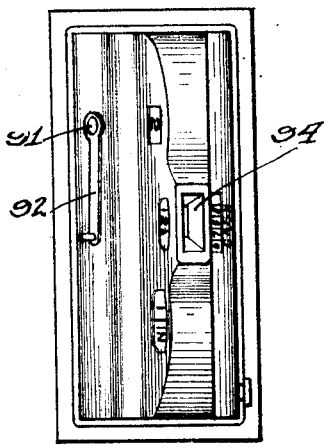
Witnesses
J. W. Angell
Charles W. Hill Jr.
Inventors
Hugo Baur
Ernest H. Thompson
by Charles W. Hill
Atty.

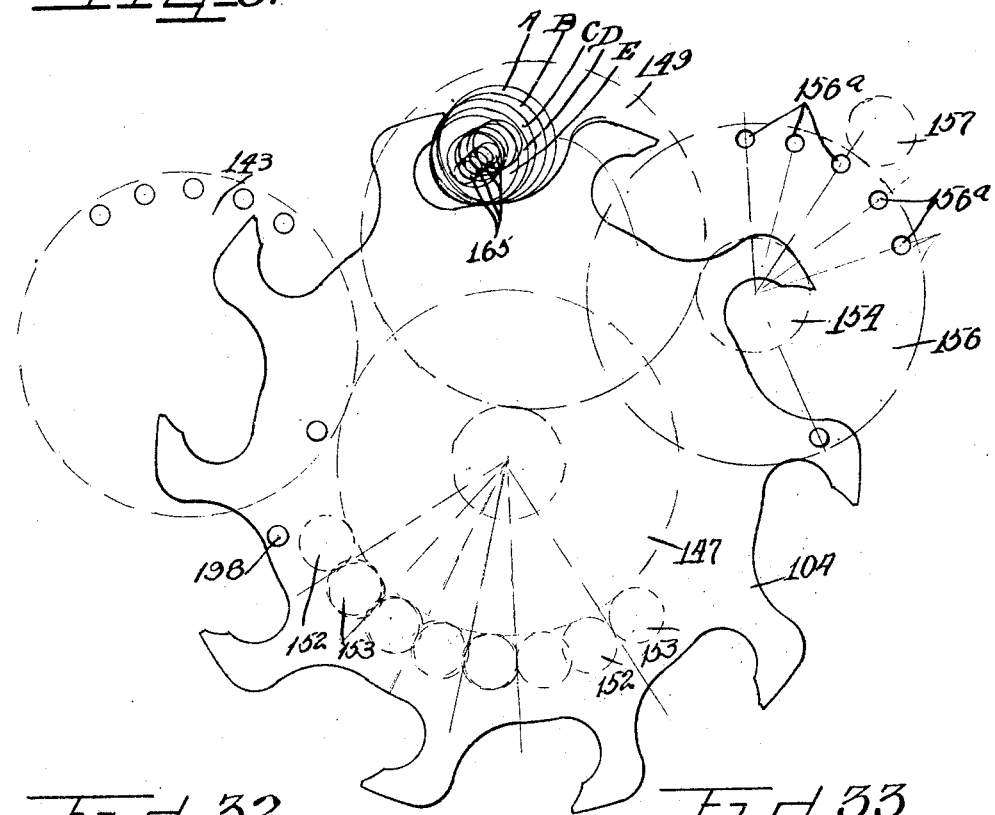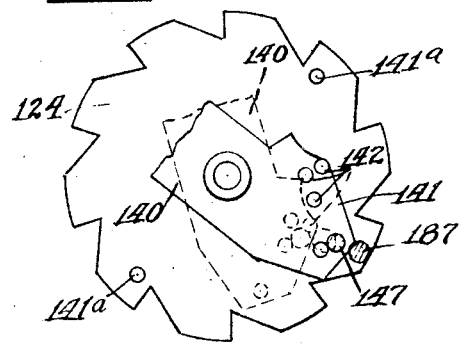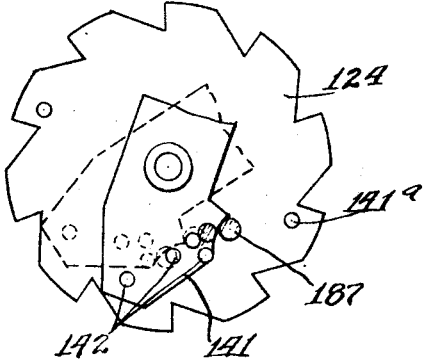

Nov. 5, 1929. H. J. BAUR ET AL 1,734,283
ZONE FARE SYSTEM
Filed July 10, 1920 19 Sheets—Sheet 11
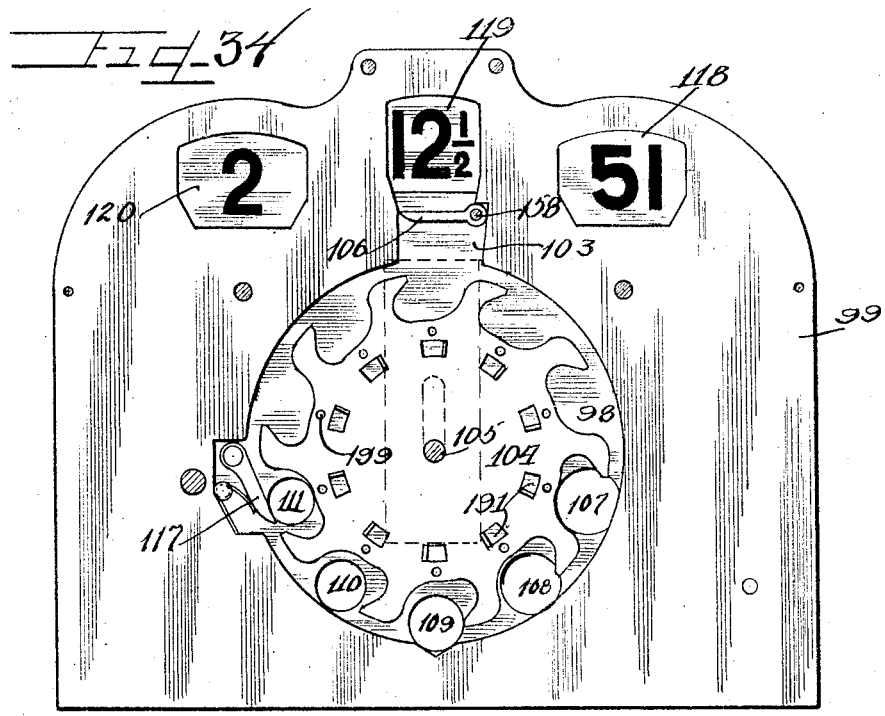
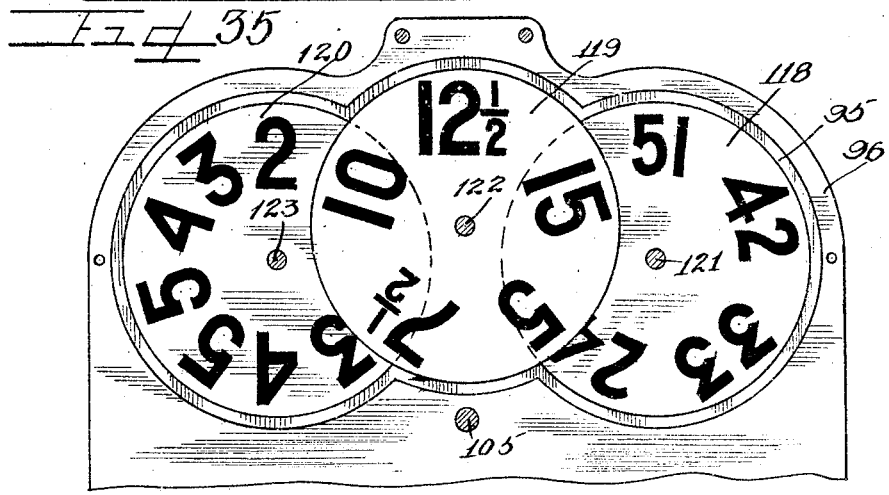

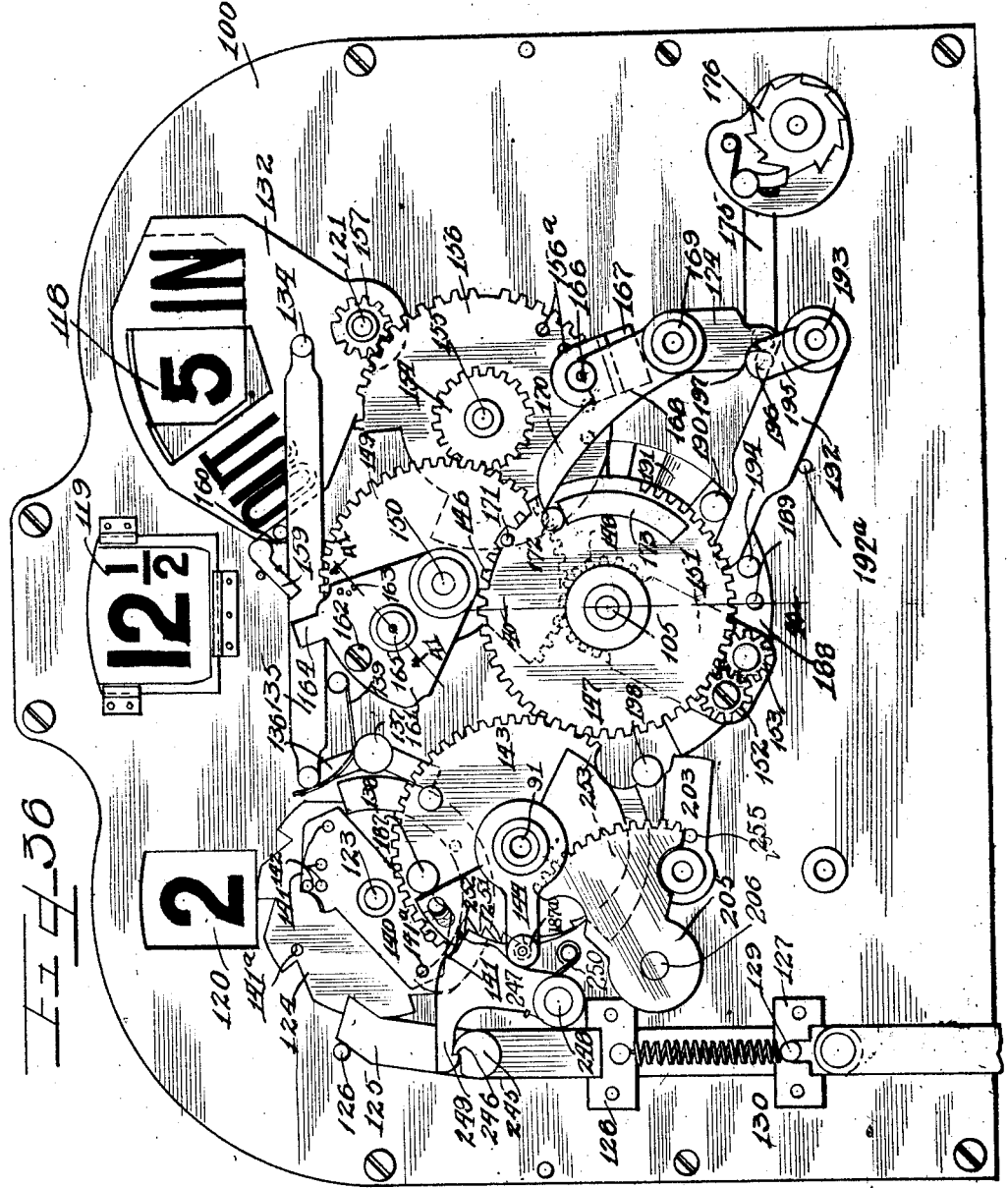

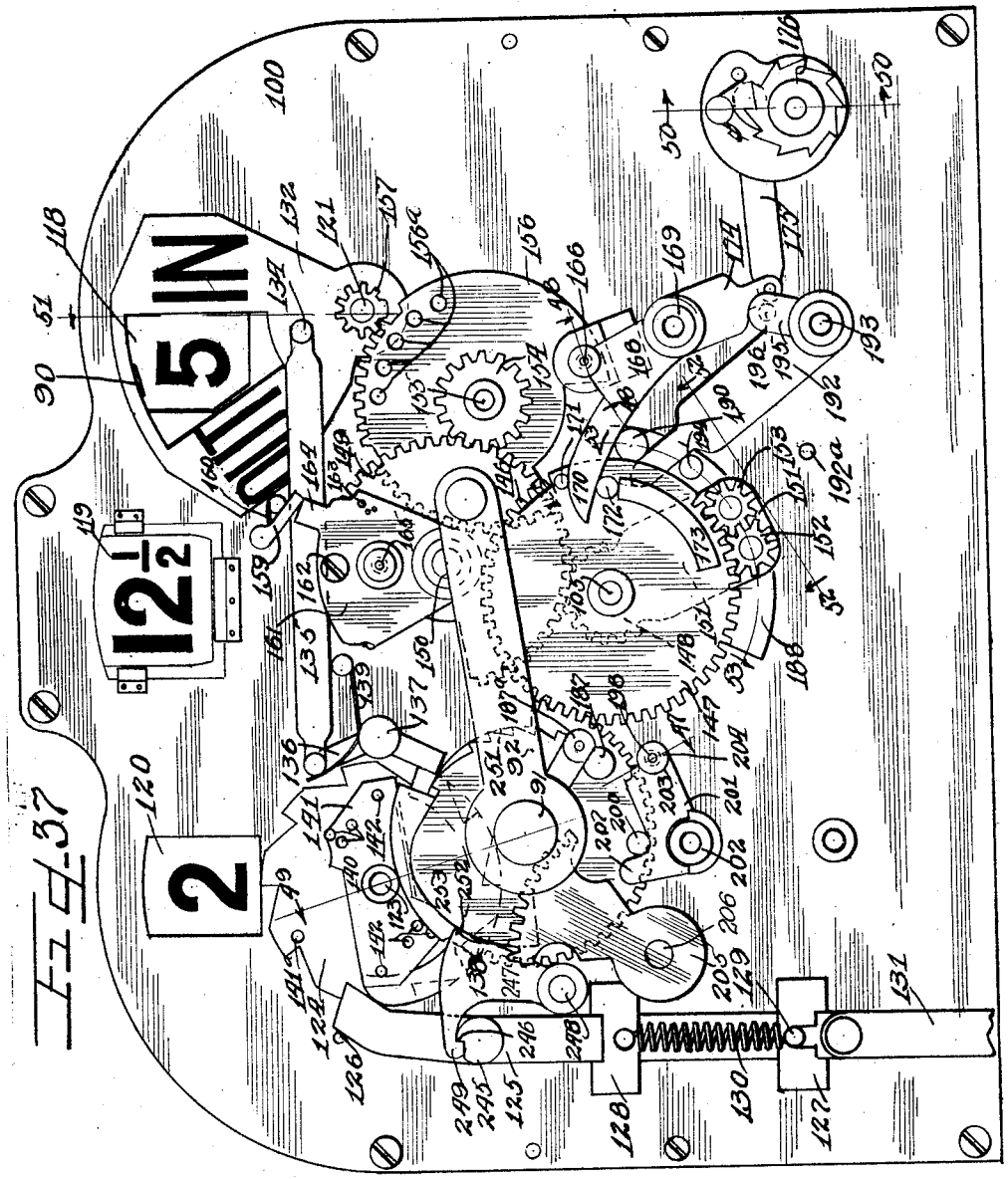

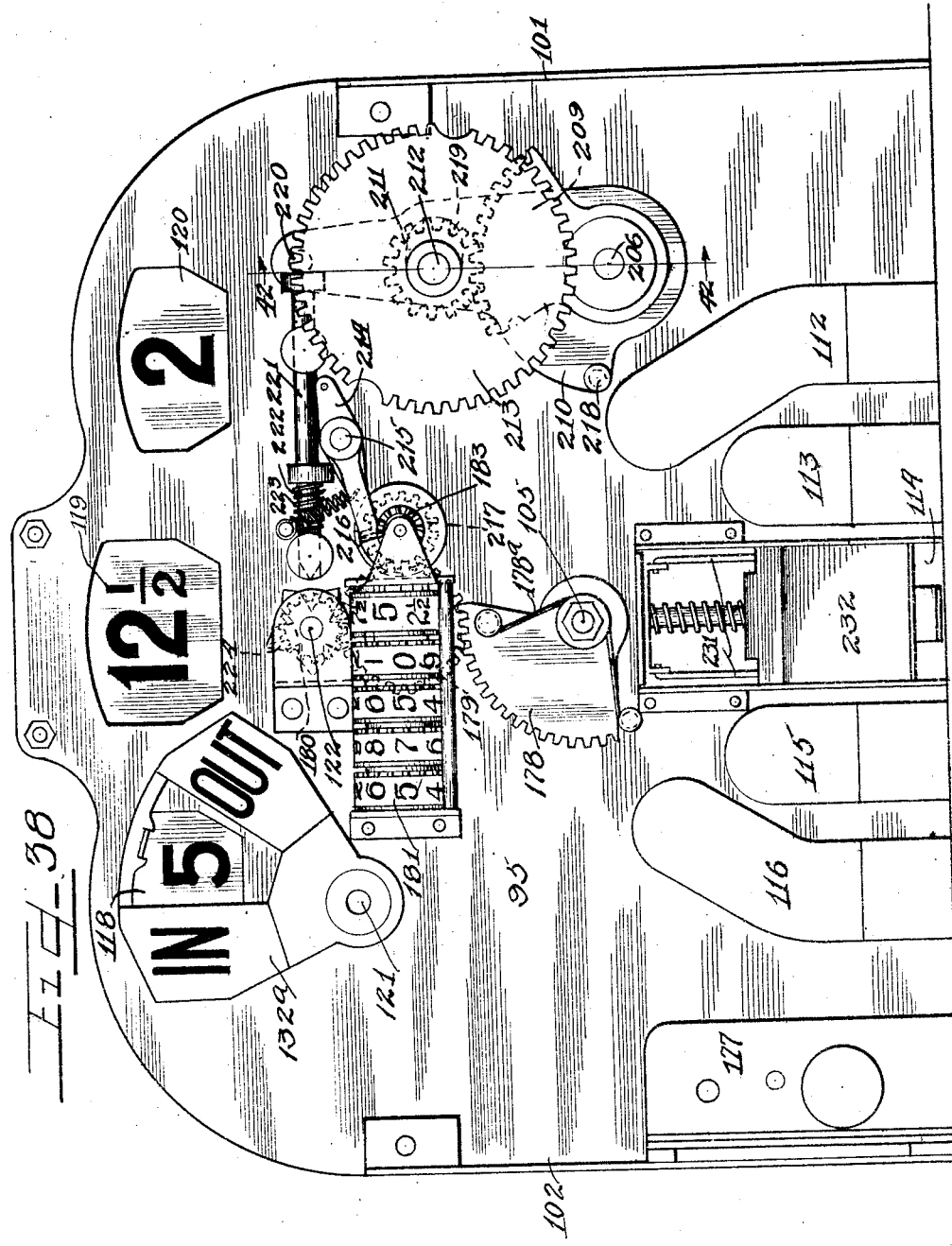

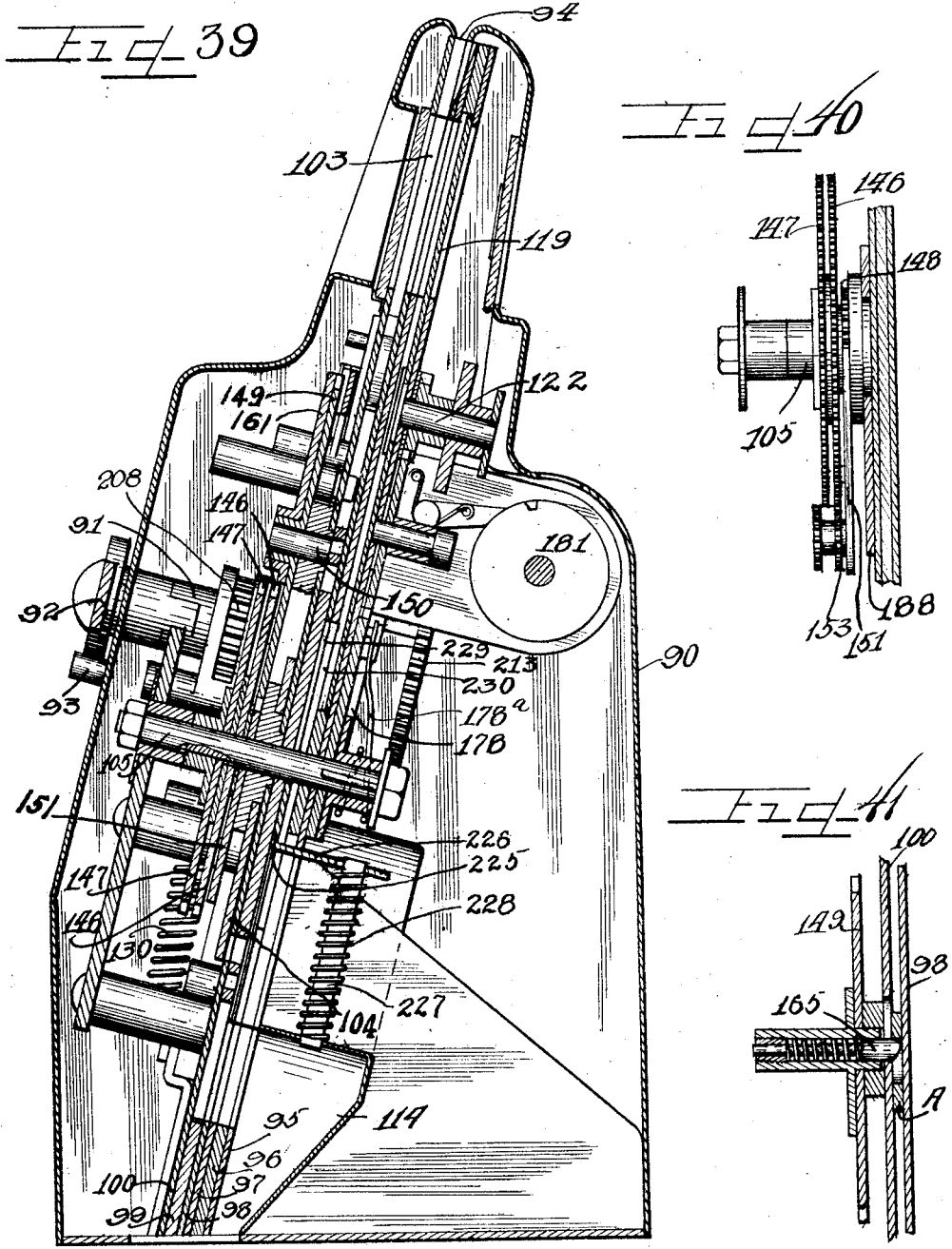

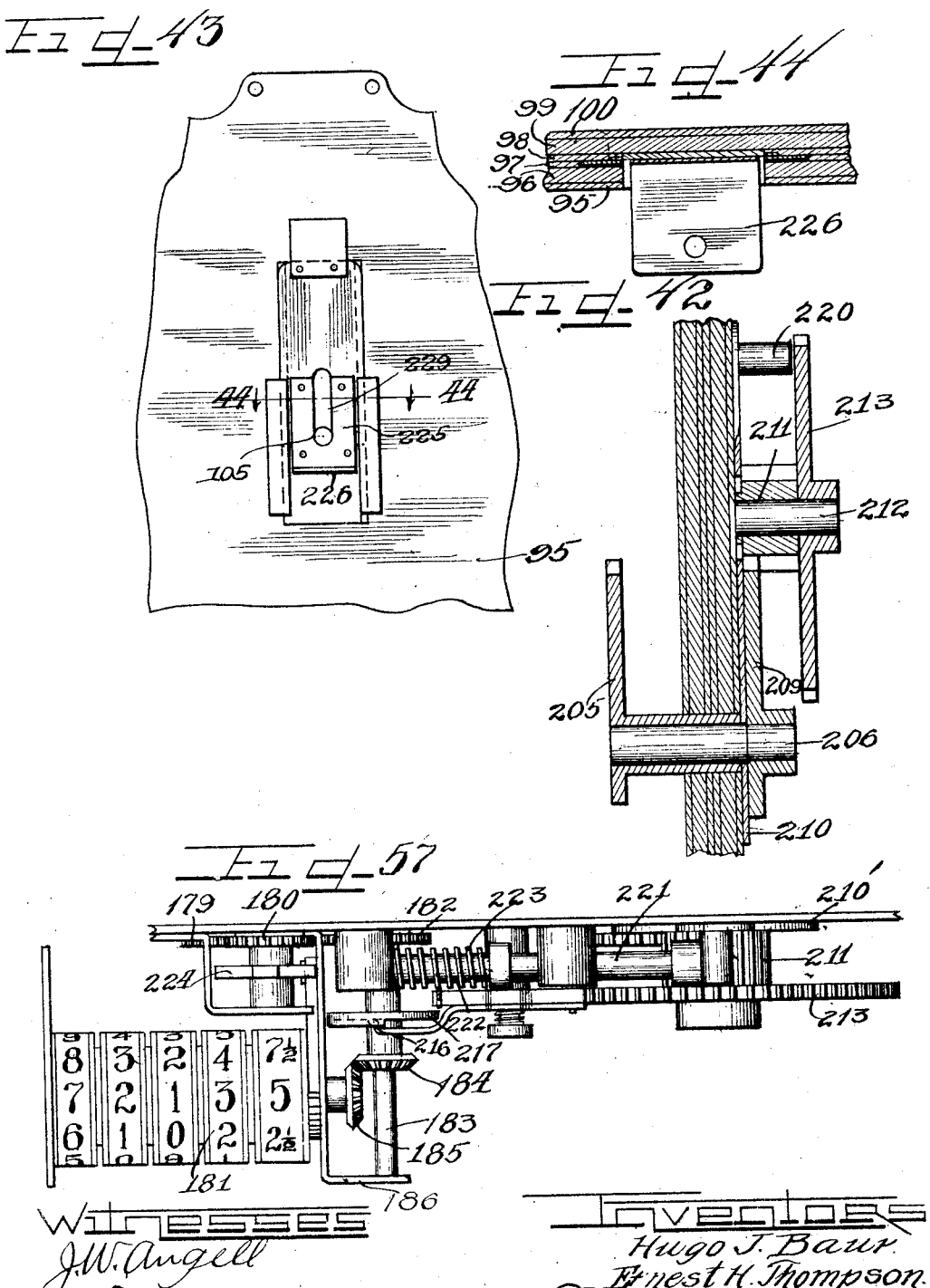

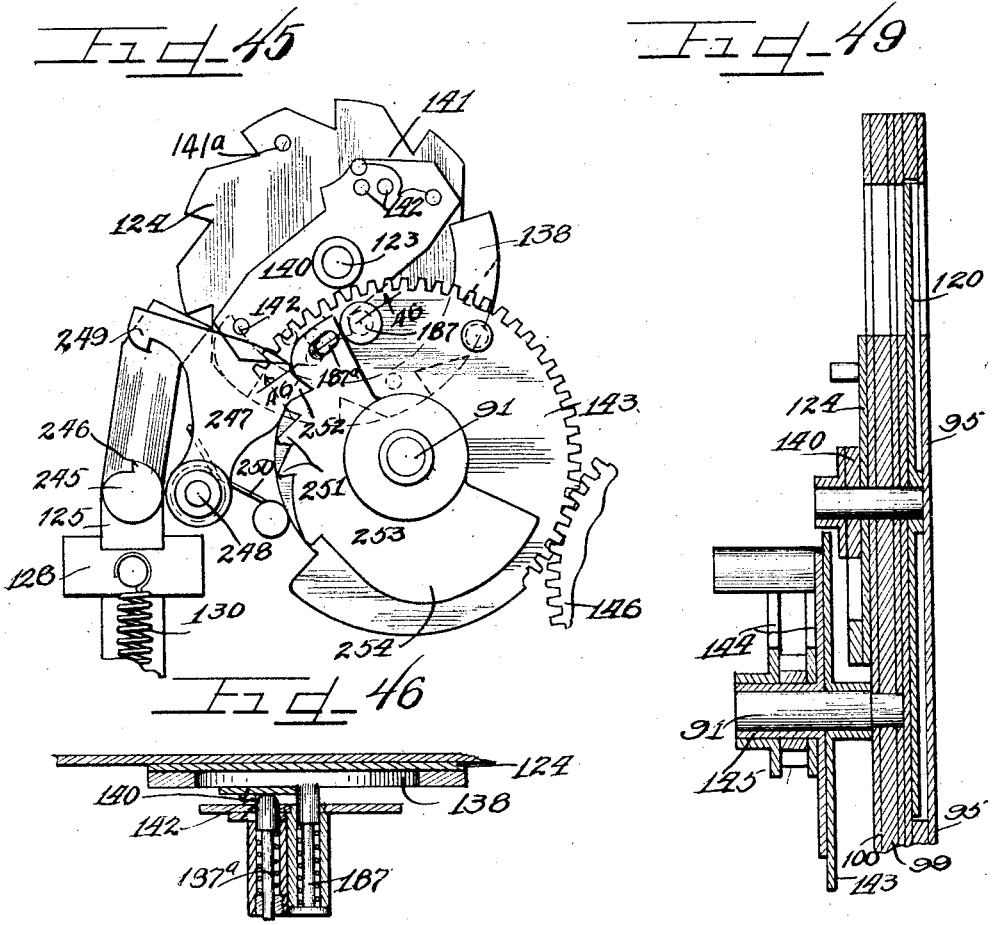

Nov. 5, 1929.  H. J. BAUR ET AL  1,734,283
ZONE FARE SYSTEM
Filed July 10, 1920  19 Sheets-Sheet 18
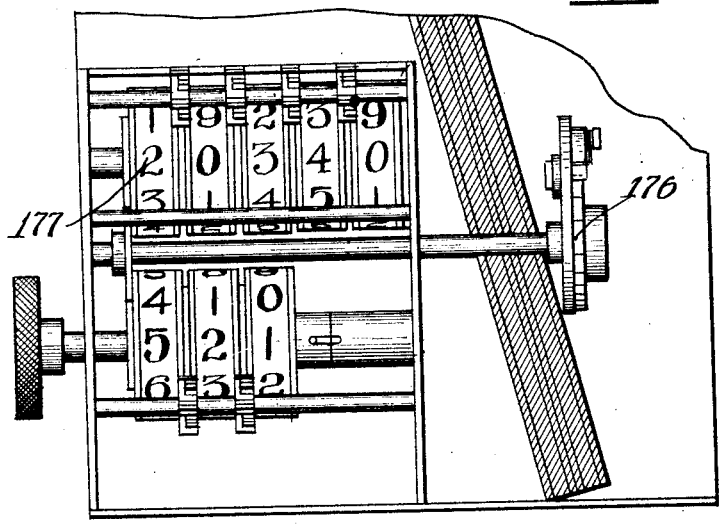
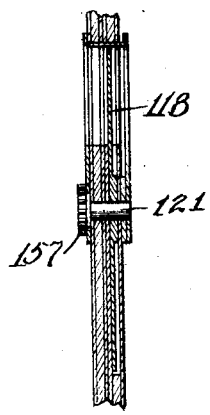
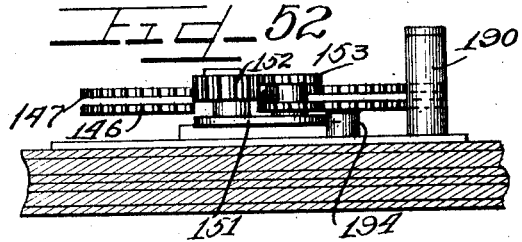
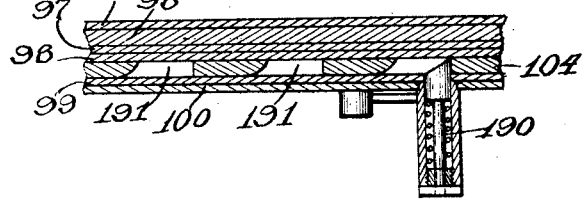

Nov. 5, 1929.  H. J. BAUR ET AL  1,734,283
ZONE FARE SYSTEM
Filed July 10, 1920   19 Sheets-Sheet 19
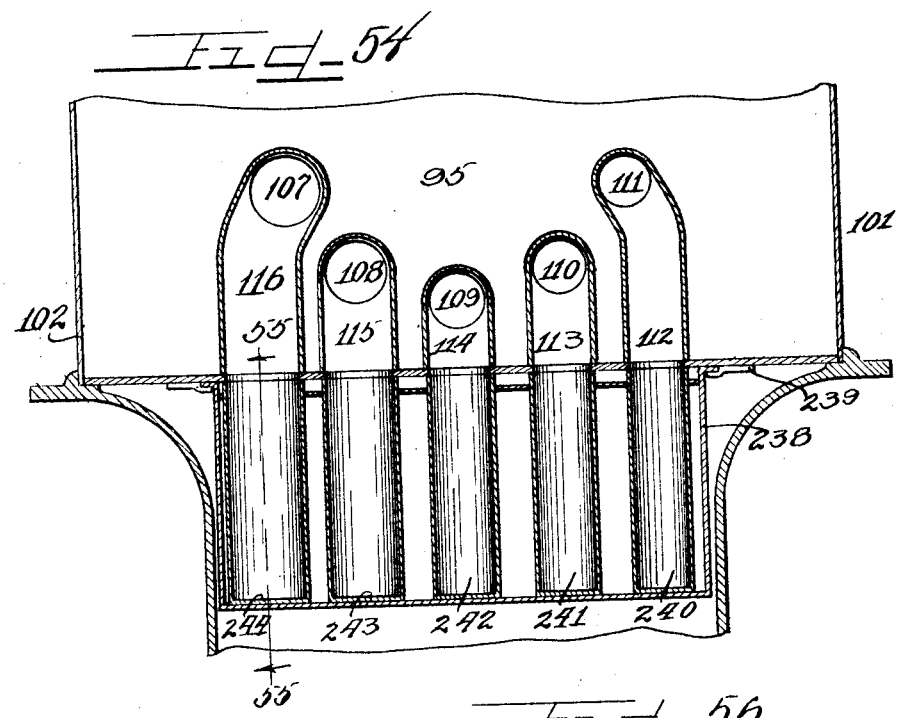
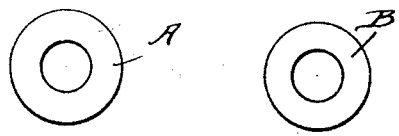
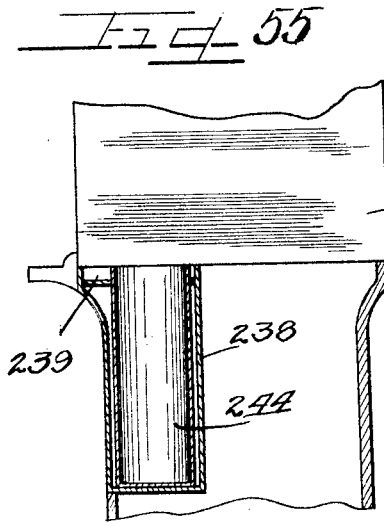
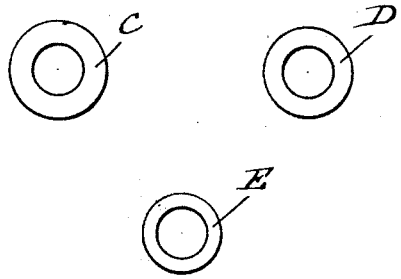
Witnesses
J. W. Angell
Charles W. Fell Jr.
Inventors
Hugo J. Baur
Ernest H. Thompson
by Charles W. Niles Atty.

Patented Nov. 5, 1929

1,734,283

UNITED STATES PATENT OFFICE

HUGO J. BAUR AND ERNEST H. THOMPSON, OF CHICAGO, ILLINOIS, ASSIGNORS, BY MESNE ASSIGNMENTS, TO SIDNEY S. GORHAM, TRUSTEE, OF CHICAGO ILLINOIS

ZONE FARE SYSTEM

Application filed July 10, 1920. Serial No. 395,242.

This invention relates to a zone fare system, and particularily to an installation comprising devices adapted to issue and account for tokens in a conveyance system wherein the zone system of fare collection is used. Said zone system of fare collection is especially desirable for use in interurban railway systems and also by street car lines. The system provides for dividing the various lines into definite zones and charging a tariff or fare which is in proportion to the zone distance travelled by the passenger while on the conveyance. In order that the proper amount of fare may be collected and in order that the transportation company may not be defrauded of this fare by dishonest agents, it is desirable that means be provided for properly ascertaining and indicating the fare to be collected for the distance travelled, and also for computing and registering the total amount of fare received.

It is an object, therefore, of this invention to provide a token issuing and accounting installation which is particularly adapted for use on conveyance systems where the zone system of fare collection is employed.

It is also the purpose of this invention to provide an installation for issuing a token corresponding to the zone in which the passenger enters the conveyance and for receiving the token when the passenger leaves the conveyance, indicating the amount which the passenger is to pay corresponding to the zone in which he leaves the car, and enumerating the said amount on a totalling device.

It is a further object of this invention to provide a token issuing and accounting machine for zone systems of fare collection whereby the tokens issued thereby and received thereby may be separately registered.

It is another object of this invention to provide a token issuing and accounting installation for zone systems, whereby the tokens issued thereby may be registered, and the tokens received thereby may be registered and enumerated.

It is another object of this invention to provide a token issuing and enumerating installation for zone fare systems having a plurality of simultaneously shiftable, manually or automatically controlled means for indicating the zone in which the conveyance is travelling.

It is also an object of this invention to provide an installation for zone fare systems having simultaneously shiftable token issuing and receiving devices associated therewith, and having separately operable token enumerating mechanisms associated with the token issuing and token receiving devices.

It is also an object of this invention to provide a token issuing and receiving installation adapted to reject improper or spurious tokens and other foreign matter and having means whereby such tokens may be conveniently removed into a receptacle provided therefor.

It is another object of this invention to provide a token issuing and accounting installation for zone fare systems which may be selectively adjusted to receive and compute different series of tokens and which will reject any tokens except those of the series for which it is adjusted.

It is an important object of this invention to provide a token issuing and accounting installation which is provided with a plurality of indicating registering mechanisms which are visible from any part of the conveyance which is equipped with the installation.

It is also an important object of this invention to provide a token issuing and accounting installation having registering and indicating mechanisms associated therewith, and having means associated with said mechanisms whereby each registering operation must be completed before a subsequent registering operation may be effected.

It is an important object of this invention to provide a registering and accounting installation for transportation systems in which the zone system of fare collection is employed, which is adapted to issue and register a token, indicative of the zone in which the conveyance is travelling at the time the passenger enters the same and to receive and register the tokens and to indicate and enumerate the amount of fare to be paid by the passenger on leaving the conveyance in accordance with the zone in which the conveyance is travelling at that time.

It is finally an important object of this invention to provide means for indicating and checking the fares paid in zone fare systems.

Other and further important objects of this invention will be apparent from the disclosure in the specification and the accompanying drawings.

The invention (in a preferred form) is illustrated in the drawings and hereinafter more fully described.

On the drawings:

Figure 1 is an elevation of a street car equipped with the installation of this invention.

Figure 2 is a view in elevation of the installation of this invention, showing the operating connections between the token issuing and receiving devices.

Figure 3 is a view in elevation of the token receiving device, showing an overhead register used thereon.

Figure 4 is a view in elevation showing the token issuing device equipped with an overhead register.

Figure 5 is an enlarged fragmentary detail elevation showing a part of the connection to the overhead registers.

Figure 6 is an enlarged front elevation of the issuing device.

Figure 7 is an elevation of the issuing device showing the registering mechanism thereon.

Figure 8 is a top plan view of the token issuing device.

Figure 9 is a bottom plan view of the token issuing device.

Figure 10 is a slightly enlarged fragmentary section on the line 10—10 of Figure 8.

Figure 11 is a top plan view of the token issuing device with the unlocking device removed.

Figure 12 is a plan view of the under side of the cover of the token issuing device.

Figure 13 is a slightly enlarged fragmentary section on line 13—13 of Figure 8.

Figure 14 is an enlarged vertical section through one of the solenoids of the interconnecting mechanism.

Figure 15 is an enlarged bottom plan view of the issuing device showing parts of the token discharging mechanism.

Figure 16 is an enlarged top plan view showing a detail of the same.

Figure 17 is an enlarged bottom plan view showing the shifting mechanism for the issuing device.

Figure 18 is an enlarged section on line 18—18 of Figure 7.

Figure 19 is a fragmentary section on line 19—19 of Figure 17.

Figure 20 is a fragmentary section on line 20—20 of Figure 17.

Figure 21 is an enlarged section on line 21—21 of Figure 9 with parts shown in elevation.

Figure 22 is a fragmentary detail on line 22—22 of Figure 21, with parts in section and parts in elevation.

Figure 23 is an enlarged fragmentary elevation of the registering mechanism for the issuing device.

Figure 24 is an end elevation of the same.

Figure 25 is an elevation of the opposite end thereof.

Figure 26 is a side elevation of a detail of the resetting means for the registering mechanism.

Figure 27 is a front elevation of the token receiving and accounting device.

Figure 28 is an end elevation of the same.

Figure 29 is a rear elevation of the same.

Figure 30 is a top plan view of the receiving device.

Figure 31 is a developed view showing the operation of the token evaluating mechanism.

Figure 32 is an elevation showing one phase of the operation of the token evaluating mechanism.

Figure 33 is a view similar to 31 showing another phase of the operation.

Figure 34 is a front elevation of the token receiving device with parts removed, showing the token receiving wheel and means for discharging the tokens therefrom.

Figure 35 is a fragmentary elevation of the token receiving device with parts removed and showing the various indicating means.

Figure 36 is a front elevation of the token receiving device with parts removed, showing one phase of the operation thereof.

Figure 37 is a view similar to Figure 36 showing another phase of the operation of the token receiving device.

Figure 38 is a rear elevation of the token receiving device with the outer casing removed therefrom.

Figure 39 is an enlarged section on line 39—39 of Figure 27, a portion of which is offset to the right to show the shaft 150.

Figure 40 is a slightly enlarged fragmentary section on line 40—40 of Figure 36.

Figure 41 is a slightly enlarged fragmentary section on line 41—41 of Figure 36.

Figure 42 is an enlarged fragmentary section on line 42—42 of Figure 38.

Figure 43 is a fragmentary elevation of the rear of the token receiving device showing the manually operated mechanism for removing spurious tokens.

Figure 44 is an enlarged fragmentary section on line 44—44 of Fig. 43.

Figure 45 is a slightly enlarged fragmentary elevation of the zone adjusting mechanism.

Figure 46 is an enlarged fragmentary section on line 46—46 of Figure 45.

Figure 47 is an enlarged fragmentary elevation on line 47—47 of Figure 37.

Figure 48 is an enlarged fragmentary section on line 48—48 of Figure 37.

Figure 49 is an enlarged fragmentary section on line 49—49 of Figure 37.

Figure 50 is an enlarged fragmentary section on line 50—50 of Figure 37.

Figure 51 is a fragmentary elevation on line 51—51 of Figure 37.

Figure 52 is a fragmentary section on line 52—52 of Figure 37.

Figure 53 is a fragmentary section on line 53—53 of Figure 37.

Figure 54 is an enlarged fragmentary section on line 54—54 of Figure 28.

Figure 55 is a section on line 55—55 of Figure 54.

Figure 56 is an elevation view showing the type of tokens used in the system of this invention.

Figure 57 is an enlarged fragmentary plan view of the totalling mechanism on the rear of the token receiving device.

As shown on the drawings:

As shown in Figure 1, the system of this invention is adapted to be installed on a street car or other conveyance 1, and comprises in general the token issuing device 2 and the token receiving and accounting device 3. Said devices 2 and 3 are each equipped with means indicating the zone in which the conveyance is traveling and in order that said indicating means may be simultaneously adjusted at each zone change, a simultaneous electrical control is provided (Figure 2). Said simultaneous control comprises a manually operated controller 4, which serves to connect solenoids 5 with a source of electrical energy 7 whereby said solenoids are energized and act to shift armatures 6 downwardly to change the zone indicating means upon the entrance of the conveyance into a new zone.

It is of course evident that mechanical simultaneous shifting means might also be employed, and that an arrangement might be provided for automatically energizing the solenoids 5 upon the entrance of the conveyance into a new zone so that the zone indicating means could be automatically shifted.

Figures 3 and 4 show an arrangement whereby the registering means 8 and 9, which indicate respectively the tokens issued by the device 2 and received by the device 3, are supported in an elevated position on columns 10, so that they are visible from all parts of the conveyance. The connections to a shaft 10ª in said column 10 are clearly shown in Figure 5.

The passenger on boarding the conveyance is given a token indicative of the zone in which the conveyance is traveling at that time, and retains said token until the time of leaving the conveyance, at which time the same is deposited in the token receiving device and a fare paid to the conductor equal to the amount shown on the register which has been determined by the zone distance that he has travelled.

The device by which the token is issued to the passenger upon entering the conveyance will now be described. As clearly shown in Figures 6 to 21, said issuing device comprises an outer cylindrical casing 11, which is mounted on a base 12 and inside of which token containing cylinders 13, 14, 15, 16 and 17 are revolvably carried and adapted to be selectively brought into register with a discharging mechanism to be described hereinafter. A cover 18 is provided for the cylindrical casing 11 (Figures 6, 7, 8, 10, 11, 12 and 13), and said cover 18 is provided with circular apertures of the proper diameter to register with the tops of the token cylinders 13, 14, 15, 16 and 17 respectively.

In order that the top of said token containing cylinders 13, 14, 15, 16 and 17 may be normally kept closed, a plate 19 is rotatably mounted between the cover 18 and the casing 11, said plate 19 being provided with circular apertures, which may be brought into registration with the apertures in the cover 18 and with the tops of the token containing cylinders when it is desired to replenish the tokens in the same.

An unlocking device which is shown in Figures 10 and 13 is provided for so actuating the plate 19 that the apertures therein are brought into register with those in the cover 18 and with the top of the token containers. Said unlocking device is mounted on a central boss 20, which is centrally apertured and adapted to be engaged over a reduced portion 21 of a shaft 22, which is axially mounted in the casing 11 and about which the token containing cylinders 13, 14, 15, 16 and 17 rotate. Supported on the central boss 20 is an arm 23, which is provided with downwardly extending pins 24 and 25 which are movable in slots 26 and 27 in the cover 18 and which are adapted to be engaged in apertures 28 and 29 in the plate 19 to rotate the same. Said unlocking device is also provided with an arm 30 secured to the boss 20 and extending outwardly at an angle therefrom, and said arm 30 is provided with a downwardly extending pin 31, which is engaged through an aperture 32 in the cover 18, and which is slidable in a slot 33 in the plate 19, as shown in Figure 12.

As shown in Figure 11, there is a definite angular relation between the apertures 28, 29 and 32, when the plate 19 is in locked position. It is therefore necessary to use an unlocking device having downwardly extending pins arranged in a similar angular relation in order to unlock the plate 19 to open the token receiving cylinders. For conveniently rotating the unlocking device the arm 23 is provided with upwardly extending handles 34 at its outer ends, as shown in Figure 13. The downwardly extending pins 24, 25 and 31 are also engaged through apertures in a plate 35, which is rotatable with the cylinders 13, 14, 15, 16 and 17, inside the casing 11, and said pins are necessarily engaged therethrough before the unlocking device will act to rotate the plate 19. It is therefore apparent that the token containing cylinders must necessarily be in the proper position before said plate 19 can be rotated to open the token containers.

Parallel with, and placed a short distance below the plate 35, is a similar plate 36, which acts to support the token containing cylinders and which is rotatable therewith about the reduced portion 21 of the axial shaft 22, as clearly shown in Figures 10 and 13.

As shown in Figure 21, an additional supporting plate 37 similar to the plate 36, and rotatable about the shaft 22, with the cylinders 13, 14, 15, 16 and 17, is provided at about the central part of the casing 11. The lower ends of the cylinders 13, 14, 15, 16 and 17 are secured in apertures in a plate 38, which is rotatable with casing 11, and which is secured to the plates 36 and 37 by means of rods 39, 40, 41, 42 and 43, which extend longitudinally in the casing parallel to the token containing cylinders, and which are rigidly secured in each of said plates, as clearly shown in Figures 10, 18 and 21.

Mounted directly beneath the plate 38 and rotatable therewith and with the token containing cylinders is a token discharge plate 44, which is provided with means whereby tokens removed from any particular cylinder may be discharged into a receiver 45 from which they may be conveniently removed and given to the passenger entering the conveyance.

Said token discharging mechanism, which is shown in detail in Figures 15 and 16, comprises conveyors 46, which are slidable in ways provided therefor in the plate 44, and which are each provided with openings 47 adapted to receive a token of the particular size contained in the cylinder beneath which the conveyor is mounted. The inward movement of said conveyors 46 is limited by a shoulder on each side of the ways in the plate 44, as shown in Figure 16, and said conveyors 46 are provided at their inner ends with upturned projections 48. As shown in Figure 18, springs 49, which are engaged around each of the rods 39, 40, 41, 42 and 43, are engaged between said projections 48 and the inner sides of the token containing cylinders 13, 14, 15, 16 and 17, and thus act to normally hold the token conveyors 46 inwardly and out of register with the openings in bottoms of said token containing cylinders. Means are provided whereby the conveyor 46 may have its opening 47 brought into register with the bottom of the token containing cylinder mounted thereupon, against the action of the spring 49, which tends to hold it inwardly. Said means are mounted on a sleeve 50, which is a continuation of the lower portion of the central shaft 22 and which extends downwardly through a central boss 51 in the base 12. A bifurcated member 52, which is provided with a downwardly extending pusher arm 53, is adapted to be engaged against the upwardly extending portion 48 of conveyor 46 and is pivoted on said sleeve 50 at 54, and said pusher arm 53 is normally held inwardly by means of a spring 55 which is engaged around the pivot 54 and secured to the sleeve 50 directly above said bifurcated member 52.

For rocking the bifurcated member 52 about the pivot 54 to push the pusher arm 53 outwardly against the spring 55, a link 56 is provided which is slidable inside the sleeve 50 and is connected by means of a pin 56ª extending through a slot 58, in said sleeve 50, with a pair of links 57, which are pivotally connected to the outer end of the bifurcated member 52. Thus the downward movement of the link 56 will act to rotate the bifurcated member 52, about the pivot 54, and will move the pusher arm 53 outwardly as shown in dotted lines in Figure 21, and consequently push the vertically extending portion 48 of the conveyor 46 outwardly, bringing the opening 47 thereof into register with the bottom of the token containing cylinder as it passes thereunder, whereby it receives a token, and whereby further outward movement thereof conveys said token outwardly through a cut away portion 59 and downwardly over a chute 60 into the receiver 45.

Means are provided for rotating the token containing cylinders selectively into position opposite the receiver 45 in order that a token corresponding to the zone in which the conveyance is travelling at the particular time may be deposited therein. This is of course effected by rotating the token containing cylinder about the axial shaft 22, a certain predetermined amount for each zone. For this purpose a handle 61, which is slidable in a slot 62, and which is pivoted about the sleeve 50, as shown in Figures 6, 17 and 18, is provided. Said handle 61 is normally held rearwardly in the slot 62 by means of a spring 63, which is coiled about the central boss 51, in the base 12, one end of which is secured at 64 to the bottom of the base 12 and the other end of which presses against the forward edge of said handle 61, as shown in Figure 17. The token containing cylinders are normally locked in position by spring actuated stops 65 and 66, which normally engage lugs 67 and 68 formed at regularly spaced intervals on the bottom of the token discharge plate 44. When the conveyor enters a new zone and it is desirable to shift a new token containing cylinder to discharging position, the handle 61 is moved forwardly in the slot 62 and disengages the stop 66 from the lug 68, and since the inner end of said handle is provided with spring controlled breakover portion 69 and a cam 70, as shown in Figure 17, it may be readily moved past the lug 68 when going in the forward direction. When said handle has reached the limit of its forward movement in the slot 62, it is released and the action of the spring 63 brings it back to its original position, the straight side of the cam 70 engaging the lug 68 and rotating the cylinder through a distance equal to the distance between said lugs which is determined by the length of the slot 62 and by the length of the stops 65. The stop 65 acts particularly to prevent rebound, a slipping in a reverse direction and engaging over with the lug 67 with a pawl action. It is to be noted that the spring pressed stop 65 is provided with a rounded surface at its outer end which enables it to move easily over the rounded portion of the lug 67, when the discharge plates and the token containing cylinders are travelling in one direction.

As shown in Figures 6, indicating means are provided for showing the zone in which the conveyance is travelling and for showing the particular token which is being discharged into the receiver 45 of the issuing device. For this purpose a plate 71 is secured around the token containing cylinders inside the casing 11, and said casing 11 is provided with a longitudinal aperture 72, through which indicating numbers provided on said plate may be viewed.

Said indicating numbers are arranged in vertical pairs, such as 1—5, 2—4, 3—3, etc., in order that the proper zone on the "in" trip or the "out" trip may be indicated. Either the upper or the lower of each of the said pairs of numbers is covered with a plate 73, on which is inscribed the word "In" or "Out", said plate 73 being slidably mounted on the outside of the casing 11 and inside a cover plate 74. The plate 73 may be manually shifted by means of a handle 75, which is slidable in slot 75' in said plate 74. Thus said plate 73 may be shifted in such a manner that the zone in which the conveyance is travelling and the indication of the "in" or the "out" trip are visible through a longitudinal aperture in the plate 74.

To provide for registering the number of tokens issued by the machine, a standard setback cyclometer 76 is secured to the upper portion of the casing 11, shown in Figures 6 and 7, and is provided with total indicating means 77 and trip indicating means 78. For connecting said cyclometer with the token issuing mechanism, a pair of levers 79 are pivoted at 80 to the link 56 and are also pivoted intermediately thereof on a boss 81 extending downwardly from the bottom of the base 12, as clearly shown in Figures 7 and 9. The outer ends of said levers 79 are forked and the forked parts thereof engage over a pin 84 secured at the lower end of a rod 82, which is slidable in a sleeve 83 secured to the outside of the casing 11, and said rod 82 connected by means of a link 85, Fig. 23, with a pawl and ratchet mechanism which actuates the cyclometer 76, which is of the usual and well-known type. The cyclometer 76, which is provided with a set-back mechanism 87, 88 and 89, is clearly shown in Figures 24 and 26.

This set-back mechanism enables the indicating portion 78 of the cyclometer to be set back without affecting the total indicating portion 77 thereof. It is thus apparent that each time the link 56 is moved downwardly to discharge the coin that the rod 82 is moved upwardly actuating the cyclometer, registering the discharge of the token. As heretofore specified, the cyclometer may be also of the overhead type and may be connected with the issuing mechanism in any suitable manner.

The passenger who has entered the conveyance and has been issued a token retains the same until he is ready to leave the conveyance, at which time he deposits the token in the token receiving device, which registers the receipt thereof and indicates and registers the amount of fare paid by the passenger in accordance with the zone in which he leaves the conveyance. The indicating and registering token receiving device, which is indicated generally by the reference numeral 3 in Figures 1, 2 and 3, will now be more specifically described.

Said token receiving device is enclosed by the casing 90, which is ordinarily of sheet metal, and which, as shown in Figures 27, 28, 29 and 30, is provided with apertures ordinarily covered by transparent material through which the various indications may be read from in front and from the rear of the machine. Said casing 90 is provided with an aperture in the front thereof through which the main drive shaft 91 of the receiving device extends, said shaft having a crank 92 mounted on its outer end for actuation thereof. The movement of said crank 92 is limited by stops 93, which extend from the face of the casing, as shown in Figure 27. As shown in Figure 30, the top of the casing 90 is provided with a slot 94 through which the tokens to be registered and enumerated by the machine are introduced thereinto.

As clearly shown in Figures 38 and 39, the operating mechanisms of the token receiving device are supported on and between a frame comprising laminated plates 95, 96, 97, 98, 99 and 100, which are secured together by means of machine screws and which are supported in position in the casing 90 by means of end plates 101 and 102. Suitable apertures are provided in said laminated plates so that the indicating means which are mounted between the same and which are to be hereinafter described, may be viewed therethrough and may also be visible through the apertures in casing 90.

A continuation 103 of the slot 94 is formed in the plate 99 and acts to convey the tokens downwardly to a receiving wheel 104, which is clearly shown in Figure 34, and which is pivoted on a shaft 105 mounted in the frame plates and is rotatable in a recess formed in the plate 99 between the plates 98 and 100. Said slot 103 is normally held closed by a spring actuated trap door closure 106, which is opened downwardly to admit a token therethrough in a manner to be described hereinafter. In order that tokens received by the wheel 104 may be discharged therefrom, openings 107, 108, 109, 110 and 111 are formed through the plates 98, 97, 96 and 95 and are respectively of the size of the various tokens received by the machine so that when a token is brought opposite its corresponding aperture it is discharged therethrough into one of the chutes 112, 113, 114, 115 or 116, whereby it is carried to a suitable receiving container which ordinarily is located beneath the receiving device.

Said receiving container is shown in Figures 54 and 55 and comprises a frame 238, which is supported beneath the chutes 112, 113, 114 and 115 on brackets 239, and in said frame and connecting with said chutes are token receiving cylinders 240 to 244. If desired an automatically locking container of any well-known type may be substituted for the one described above whereby the tokens may be removed from the receiving to the issuing device without danger of their being tampered with by the person removing the same.

The direction of rotation of the wheel 104 is such that the tokens pass the forward aperture 111 first and the others in succeeding order so that a larger token will first pass the smaller apertures and be conveyed to the proper one for discharge. The smallest tokens are held in proper position for discharge by the spring pressed pawl 117 and by the edges of the recess in the plate 99, as clearly shown in Figure 34.

As shown in Figure 35, disks 118, 119 and 120 are pivoted on shafts 121, 122 and 123 respectively, in recesses in the plate 96 between the plates 95 and 97 and said disks have numerals marked thereon for indicating the various steps of the token receiving operation. The disk 118 is provided with numerals for indicating the zone in which the passenger entered the conveyance, the disk 120 is provided with numerals for indicating the zone in which the conveyance is travelling at the time when passenger leaves the same, and the disk 119 is provided with numerals indicating the amount of cash fare to be paid by the passenger in accordance with the zone distance that he has travelled. The numerals on said disk are properly arranged on both the front and rear thereof so that the information furnished thereby may be viewed through the apertures in either the front or the rear of the casing 90.

A mechanism which is provided for adjusting the indicating disk 120 in accordance with the zone in which the conveyance is travelling is shown in Figures 37 and 45. Said mechanism comprises a ratchet disk 124, which is secured on the shaft 123 outside the plate 100, and which is adapted to be rotated in a clockwise direction to rotate said shaft and the indicating disk 120 by means of a pawl 125, which is guided into the notches of said ratchet disk by a pin 126, and the lower portion of which is slidable in bracket guides 127 and 128, which are secured to the outside of the plate 100. Said pawl 125 is provided with a pin 129 secured to the outer side thereof below the bracket guide 127 and secured to said pin is one end of a coil spring 130, the other end of which is secured to the outer side of the bracket guide 128. For connecting the pawl 125 with means for actuating the same, a link 131 is pivotally connected to the lower end thereof below the bracket guide 127. It is thus evident that said pawl 125 may be pulled downwardly until the upper end thereof is engaged under the next lower notch in the ratchet disk 124, and upon releasing the link 131 the coil spring 130 will pull said pawl upwardly, rotating the ratchet disk 124, one notch at a time in a clockwise direction.

Interconnected with said zone indicator setting device is an "in" and "out" indicator for the indicating disk 118. Said indicator comprises segmental apertured disks 132 and 132$^a$, which are pivoted on the shaft 121 on the outside of the plates 100 and 95, and said segmental disk 132 is provided with the word "In" on the right side of the aperture therein and the word "Out" on the left side of the aperture therein, while the same words on the disk 132$^a$ are arranged in reverse order. Pivoted on said disk 132 at 134 is a link 135 and the opposite end of said link is pivoted on the upper end of a bell crank lever 136, which is pivoted on the outside of the plate 100 at 137. Said link 135 and the upper end of the bell crank lever 136 are normally held away from the ratchet disk 124 by means of a spring 139, which is secured to the plate 100 and engaged around the pivot 137 and resting against the pivotal connection between the upper end of said bell crank lever 136 and the link 135. In order that the upper end of said bell crank lever and the outer end of said link may be held inwardly toward the ratchet disk 124 during the "in" trip, a cam 138 is secured on the outer face of said ratchet disk and engages the lower end of the bell crank lever 136 to hold the upper end of the same inwardly toward the ratchet disk 124 during the "in" trip so that the "in" indicator on the segmental disk 132 will be visible through the proper aperture in the casing 90. Secured to the outer face of the ratchet disk 124 and extending substantially diametrically thereof is a plate 140, which is provided at each end with a cam edge 141 and with a plurality of releasing pins 142 extending a short distance from the surface thereof for a purpose to be described hereinafter. A plurality of stop pins 141$^a$, preferably though not necessarily diametrically opposed, are mounted on the ratchet disk 124 (Figures 32, 33, 36, 37, and 45) also for a purpose which will later appear.

For applying power to the various mechanisms a mutilated gear 143 is rotatably mounted on the shaft 91 and is adapted to be rotated by rotation of the crank 92, which is connected to said gear through a pair of arms 144, which are secured to a sleeve 145 mounted to rotate with the shaft 91 and which are connected with said mutilated gear 143 by a spring pressed pin 187$^a$, which is mounted in the outer ends of said arms. Said mutilated gear 143 meshes with a gear 146 which is pivoted on the shaft 105 inside a gear 147 secured to said shaft. Pivoted on said shaft 105 inside the gear 146 is a toothed segment 148, the teeth of which are normally adapted to mesh with a mutilated gear 149, which is pivoted on the shaft 150. Said toothed segment 148 is provided with an extension 151, which extends outwardly beyond the peripheries of the gears 146 and 147, and on which is pivoted idler pinions 152 and 153, which mesh with each other and of which the pinion 162 meshes only with the gear 147, while the pinion 153 meshes only with the gear 146. For transmitting movement to the zone indicator 118, said mutilated gear 149 meshes with a gear 154 (Fig. 36) which is pivoted on a shaft 155 and to which is secured a mutilated gear 156, which meshes with a gear 157, which is connected to the shaft 121 and acts to rotate said shaft and the indicator disk 118. In order to facilitate the proper assembling of the gear 157, on the shaft 121, said gear is made with one wide tooth which is adapted to mesh in a double width space in the gear 156.

Tokens which distinctively indicate the zone in which the passenger entered the conveyance are deposited in the slot 94 on his leaving the same and serve to control the movement of the registering and indicating mechanism so that the proper amount of fare is registered and indicated. Said tokens ordinarily comprise centrally apertured disks (Figure 56) which are of different size and have a central aperture of different size for each zone. Tokens of the form usually employed are shown in Figure 56 and indicated by the reference letters A, B, C, D and E respectively. The token which is dropped through the slot 94 falls on the trap door closure 106 inside said slot where it is retained in position in readiness for registering and enumerating upon actuation of the crank 92. Said trap door is secured to a shaft 158, which is pivotally mounted in the frame plates and extends outside the frame plate 100, where it is provided with an arm 159 secured thereon, and a spring 160 secured to the plate 100 acts normally to hold said arm in the position shown in Figure 36 and to hold the trap door closed. For opening the trap door 106 to allow one token to drop between the fingers of the receiving wheel 104 and for operatively connecting said token and wheel with the registering and enumerating mechanism a segment 161 is provided and is pivoted on the shaft 150 outside of the gear 149. Said segment is prevented from rotation relative to said gear by means of a pin 163 extending through the segment into the gear and a set-screw 162, as clearly shown in Figures 36 and 37. Said segment is provided with an extension 164, which is adapted to engage the arm 159 and move the same to the right to open the trap door 106, as shown in Figure 37. For connecting the segment 161 and gear 149 with the token which has been deposited between the fingers of the receiving wheel 104, a spring-pressed pin 165 is mounted on said segment and extends through the same, through the gear 149 and through a slot in the plate 100 into the aperture in the center of the token. Movement of the crank 92 to the right therefore acts through the gears 143, 146, 148 and 149 to actuate the segment 161 and causes the extension 164 to engage the arm 159 to open the trap door 106 and causes the token to fall onto the receiving wheel 104. At this time the various mechanisms are in positions shown in Figure 37 with the apertures 156$^a$ in the mutilated gear 156 held upwardly as shown. The machine is now in readiness to register and enumerate the token. When the crank 92 is moved to the left the mutilated gear 149 and the segment 161 rotate about the shaft 150 in a counter-clockwise direction until the spring pressed pin 165 stops on account of reaching the limit of its travel in the central aperture in the token. This acts to stop further movement of the gear 149 and the segment 161, and further rotation of the crank 92 to the left, causes the gear 147 to be rotated in a counter-clockwise direction by the idler pinion 152. Prior to this movement of gear 147, the gear 156 rotates in a clockwise direction and the apertures 156$^a$ therein are brought downwardly into the position shown in Figure 36.

The angle through which the mutilated gear 156 has moved before stopping, of course, depends upon the size of the tokens and upon the size of the apertures therein and the zone in which the passenger entered the conveyance is shown by said indicating disk.

Means are provided for locking said mutilated gear 156 in stopped position. For this purpose a spring pin 166, which is pressed outwardly by a spring 166ª (Figure 48) and which is mounted in a bracket 167 secured to the plate 100, is adapted to be engaged through one of the apertures 156ª which has been stopped in the proper position therefor. Said spring pressed pin 166 is forced into position through the proper aperture 156ª by means of an arm 168, which moves through a slot in the casing 350 of said pin 166 and forces the same downwardly through the aperture 156ª. Said arm 168 is pivoted on a stub shaft 169 and is provided with an upwardly extending finger 170 which is normally engaged between pins 171 and 172 extending outwardly from the face of the gear 147 to lock said gear in position, but upon counter-clockwise movement of said gear 147, said pins 171 and 172 move away from the extension finger 170, which is caused to rise on the cam 173, thus forcing a portion of the arm 168 outwardly through the slot 350 in the sleeve of the pin 166 to force said pin downwardly. The arm 168 is provided with a downward extension 174, which is pivoted to a link 175 whereby when said downward extension 174 is moved inwardly said link 175 actuates the pawl and ratchet mechanism 176 of a standard set-back cyclometer 177, which is shown in Figures 38 and 50 and which registers the receipt of the token.

From the point at which the indicating disk 118 is stopped by the engagement of the pin 165 in the aperture in the token and by the engagement of the spring pressed pin 166, in the aperture 156ª, the indication and the computation of the amount of fare to be paid by the passenger begins. Further movement of the crank 92 to the left transmits movement to a toothed segment 178, which is keyed on the shaft 105 in rear of the plate 95, as shown in Fgiure 38, and which is normally held in the position shown by a spring 178ª. This movement of said shaft of course is effected by the counter-clockwise movement of the gear 147 heretofore described. This movement of the gear segment 178 is transmitted through gears 179 and 180 to the shaft 122, to rotate the fare indicating disk 119 through the proper angle to indicate the proper amount of fare to be paid. The movement of the gear segment 178 is also transmitted through the gear 179 to a gear 182 (Fig. 57) which is mounted on a shaft 183, supported in a bracket 186 secured to the rear of the frame plate 95, and through a bevel gear 184 on said shaft to a bevel gear 185 which actuates a totalling cash cyclometer 181, the movement of which is proportional to the angle of movement of the gear segment 178 and which totals the amount of cash fares that are indicated on the disk 119. (Figures 38 and 57).

The amount of angular movement of the gear 147 and the gear segment 178 is limited by the engagement of the spring pressed pin 187, (Figures 45 and 46), which is mounted on the mutilated gear 143, with the cam 141 or the pin 141ª on the plate 140, said cam or pin of course being in such postion that the limiting of said movement is dependent on the zone in which the conveyance is travelling. In order that a complete movement to the left of the crank 92 may be completed after the mutilated gear 143 has been stopped by the engagement of the spring pressed pin 187 with the cam 141, the spring pressed pin 187ª, Fig. 46, which connects said crank to the gear 143, engages one of the pins 142 in the plate 140 and the crank released.

This completes the registering, indicating and computing operations and the subsequent movement of the crank to the right clears the machine in a manner which will now be described. A segment 188 is pivoted on the shaft 105 and is provided with a pin 189, which is adapted to be engaged by the extension 151 on the toothed segment 148 upon the movement of said extension to the right. Also mounted on said segment 188 is a spring pressed pin 190, which is adapted to be engaged in cam recesses 191 which are formed in the receiving wheel 104, as clearly shown in Figures 34 and 36.

Thus the movement of the extension 151 to the right causes said extension to engage the pin 189 and to move the wheel 104 in a counter-clockwise direction an amount equal to the angle between said cam recesses 191, due to the engagement of spring pressed pin 190 with the straight side of one of said cam recesses 191. Means are provided whereby said segment 188 is moved in a clockwise direction, Fig. 36, during the counting and registering operation to be in readiness to again move the wheel 104 during the next movement of the crank 92 to the right, in other words during the next clearing operation. Said mechanism comprises a finger 192, which is pivoted on a stub shaft 193 on the face of the plate 100 and which extends between the spring pressed pin 190 and a rigid pin 194 on the segment 188. Downward movement of said finger is limited by a stop 192ª. Secured to said finger 192 and rotatable therewith about the stub shaft 193 is a short crank arm 195, which is provided with a pine 196 adapted to engage a cam 197 formed on the lower portion of the extension 174 of the arm 168, clearly shown in Figures 36 and 37. Thus when the finger 170 is caused to ride on the cam 173, the engagement of the cam 197 on the downward extension 174 of said finger will force the outer end of the finger 192 downwardly, causing the segment 188 to move in a clockwise direction, the spring pressed pin 190 riding over the rounded side of the cam recess 191 and said segment moves to the right until the spring pressed pin 190 is engaged in the next cam recess 191. The pin 196 also acts to hold the arm 168 in proper position so that the pin 166 is locked in the proper aperture 156ª during the enumerating and registering operation. A detail of said spring pressed pin 190 showing the operation thereof is shown in Figure 53.

Mechanism is provided whereby the token receiving wheel 104 is locked in position during the registering and computing operation. For this purpose said receiving wheel 104 is provided with a series of drilled holes 199, near the periphery thereof and a pin 198, which is normally held outwardly by a spring 351 engaged therearound, is adapted to be forced into the proper one of said drilled holes 199 by the engagement of the pin 200, which is mounted on the gear 143 with a portion 207 of a pivoted arm 201 which is pivoted on a stub shaft 202, and which has a portion 203 adapted to be engaged in a notch in the sleeve 204 of said pin 198 to force said pin downwardly into the proper aperture 199 in the token receiving wheel 104 and to hold the same therein during the registering and enumerating operation (Figure 47). Said crank arm 201 is disengaged from the notch in the sleeve 204 and releases the pin 198 when the crank 92 is moved to the left as far as it will go. This is accomplished by the engagement of a toothed segment 205 which is mounted on a shaft 206 extending through the frame plate with a stud pin 255 on the arm 201. This segment 205 receives its movement from the crank 92 by meshing with a gear 208 which is mounted on the shaft 91 between the forked members 144 (Figure 39).

The movement of said segment 205 is transmitted through the shaft 206 to a similar segment 209 (Figures 38 and 42), which is mounted in rear of the machine outside the plate 95 and acts to control an interlocking mechanism for the cash totalling device 181. Said mechanism, which is clearly shown in Figure 38, is actuated by a plate 210 pivoted at 206 on the plate 95 and comprises a gear 211 which is in mesh with the segment 209 and which is mounted on a shaft 212. Mounted on the shaft 212 outside of said gear 211 is a mutilated gear 213, which is adapted to be engaged by spring controlled pawl 214 which is pivoted at 215. The engagement of said pawl 214 with the mutilated gear 213 provides a positive lock against backward rotation or turning back of the totalling device once the counting operation has started. Said pawl 214 is normally held away from said mutilated gear 213 by engagement of the end thereof with a flange 216 on a plate 217, said flange being moved by the rotation of said plate which is attached to the shaft 183 and is rotated during the counting operation, as heretofore described. Means are also provided for locking the totalling device 181 out of operation at all times except when a token is deposited in the machine. For this purpose said plate 210, which is pivoted on the shaft 206, is provided with a stop 218 which is adapted to be engaged by the edge of the gear segment 209 when the gear segment has reached the extremity of its travel to the left. Thus said plate 210 is rocked about the shaft 206. Said rocking movement is permitted by providing a slot 219 in the plate 210 through which the shaft 212 passes. A pin 220 in the upper end of said plate 210 is adapted to engage the end of a plunger rod 221 and to force a plunger 222 against the action of a spring 223 the notches of a star wheel 224 which is secured to the gear 180, thus locking the totalling device against manipulation at all times except when a token is deposited. The en engagement of the reciprocating plunger 222 with the star wheel 224 also acts to align and centralize the totalling device 181 for each operation.

An arrangement which is clearly shown in Figures 38, 39, 43 and 44 is provided for clearing the machine of improper tokens and other foreign matter that would prevent the proper operation of the machine. Said device comprises a longitudinal plate 225, which is slidable in a slot provided therefor in the plate 98 and which is provided at its lower end with an outward extension 226, as clearly shown in Figure 39. Said outward extension 226 rests on a rod 227, which is slidable through an aperture in the upper part of the chute 114, and for normally holding said plate 225 upwardly in the slot provided therefor in the plate 98 a coil spring 228 is engaged around said rod 227 between the extension 226 and the upper and outside part of the chute 114. Said plate 225 is slotted at 229 in order that it may slide past the shaft 105 and an additional slot 230 is provided in the plate 97 in order that the tokens to be removed may fall therethrough when the plate 225 is moved downwardly by depressing the extension 226 thereon. This depression of the extension 226 on the plate 225 may of course be accomplished by a lever which is operated from the outside of the machine. A pair of links 231, which are clearly shown in Figure 38, provide connections from said extension 226 to the operating lever. A suitable chute 232 is also provided whereby the disfigured tokens, spurious coins or other foreign matter which are removed from the machine by the depression of the extension 226 may be conveyed into a locked container. Thus if a disfigured token becomes jammed in the receiving wheel 104, it is only necessary to slide the plate 225 back and forth in the slot in the plate 98 provided therefor until the token is loosened, when it will fall downwardly through the slot provided therefor in the plate 97, and be conveyed to a container by the means of the chute 232. The coil spring 228 acts to return said plate 225 to its proper position back of the coin receiving wheel 104. For operating said token removing device, a lever 233, which is shown in Figures 29 and 27, may be connected to the links 231.

An interlocking device is provided for preventing the shifting of the pawl 125 and the ratchet disk 124 during the computing and indicating operation. For this purpose a boss 245 having a stop projection 246 thereon is secured to the face of said pawl. A dog 247, which is pivoted on the plate 100 at 248, is provided with a catch 249 and adapted to be engaged over said stop at all times except when the ratchet disk 124 is being shifted. Said dog is held inwardly by a spring 250, as shown, and when released by shifting of the pawl 125 a portion 252 thereof engages a ratchet 251, which is formed on a plate 253 secured to the mutilated gear 143. Thus the crank 92 is locked against backward movement until it has completed its travel to the right, at which time a cam 254 on said plate 253 disengages the dog 247 and forces the pawl 249 over the stop 246.

The operation is as follows:

The system described in this invention is one adapted to be used in a "pay as you leave" system of fare collection, and is particularly adapted for use on street cars or other conveyances, the routes of which are divided into zones and a separate fare charged for each zone traversed. The system described herein contemplates charging a fare of 5 cents within zones and an additional fare of 2½ cents for each additional zone traversed, but it is readily apparent that the tokens may be given any value desired. The indicator 71 on the issuing device and the indicator 120 on the receiving device are simultaneously adjustable to indicate the particular zone in which the conveyance is travelling at any particular time. This may be accomplished manually by either the motorman or conductor upon the conveyance entering a new zone when the solenoid controlling device shown in Figure 2 is actuated to shift said indicating means, or the adjustment may be made automatically by having electrical contact means connected with the solenoid control and mounted on the trolley wire or third rail at the zone boundaries. If desired mechanical means may also be used for connecting the indicating mechanism for simultaneous adjustment or they may be separately adjusted by the motorman and the conductor actuating the levers 61 and 131, respectively, when the conveyance enters a new zone. Upon entering the conveyance the passenger is given a token A, B, C, D, or E, respectively, corresponding to the zone in which the conveyance is travelling at that time. This token is issued from the issuing device 2 by either the motorman or the conductor who depresses a lever connected to the link 56, whereby the token is issued into the container 45 (Figure 21) and is registered by the set-back cyclometer mechanism as heretofore described. Said cyclometer mechanism 76 therefore provides means whereby the number of passengers that have entered the conveyance may be ascertained. The issuing device 2 may be of course opened to insert additional tokens into the cylinders 13, 14, 15, 16 and 17 by means of the unlocking device 20, which is clearly shown in Figures 10 and 13.

The passenger retains the token issued to him until he is ready to leave the conveyance, at which time it is given to the conductor, who deposits it in the slot 94 in the receiving device 3, which registers the same and computes and indicates the fare to be paid by the passenger depending upon the zone distance which he has travelled, registers the amount of his fare upon the totalling device 181 and indicates the zone from which and to which the passenger has travelled and finally registers and deposits the token in the proper cylinder of a container provided therefor.

The operation of the mechanism whereby the various accounting and totalling and indicating mechanism perform their various functions is best described by reference to Figures 31, 32 and 33, on which a diagrammatic outline of the operation is indicated. As shown in Figure 31, the tokens A, B, C, D or E which are deposited into the receiving device through the slot 94 therein are received between the fingers of the receiving wheel 104 assuming the position shown therein, a line drawn through the center of each of said tokens forming a definite angle with the vertical. When the crank 92 is moved to the right the spring pressed pin 165 is moved to the right, being carried with the mutilated gear 149, which is represented in Figure 31 by a dotted circle as shown, and upon the return of said crank to the left, said spring pressed pin 165 is carried to the left on said mutilated gear 149 until it is engaged against the side of the aperture in the token which is deposited between the fingers of the token receiving wheel 104, which has been locked in position as heretofore described by the engagement of the arm 201 with the slot in the sleeve 204 of the spring pressed pin 198, whereby said pin 198 is engaged through the proper aperture 199 in said wheel 104. The engagement of said spring pressed pin 165 against the edge of the central aperture of the token locks the machine and determines the angle at which the totalling and indicating operations begin. The rotation of the crank 92 to the left as far as the point of engagement of the spring pressed pin 165 against the side of the aperture in the token has determined the indication on the disk 118, which indicates the zone in which the passenger has entered the car. Said indicating disk 118 is driven from the mutilated gear 149 through the gears 154, 156 and 157 and in order that it may properly indicate the zone in which the passenger boarded the car, the rotation of said gear 157 is stopped at the proper point due to the stoppage of said gear 156 and the engagement of the spring pressed pin 166 in the aperture 156$^a$. As shown, the angular distance travelled up to the time of engagement of said spring pressed pins 165 and 166 is the same. From the point of stoppage due to the engagement of the spring pressed pin 165 against the side of the aperture in the token the computing and indicating operation begins and is continued by the movement of the crank 92 to the left, the fare indicator disk 119 and totalling mechanism 181 being driven from the gear 147, which is driven in a counter-clockwise direction by the rotation of the crank through the multilated gear 143 and gear 146 and the idle pinions 152 and 153, which are driven from said gear 146. The amount of fare indicated on the disk 119 and totalled on the device 181 depends upon the angle travelled through by the gear 147 after the stoppage of the rotation of the mutilated gear 149 by the engagement of the spring pressed pin 165 against the side of the aperture in the token. The other limit of this indicating and totalling angle is determined by the stoppage of the rotation of the mutilated gear 143 due to the engagement of the spring pressed pin 187, which is carried thereby, with the cam 141 or the pin 141$^a$ on the zone shifting ratchet disk 124. The portion of the cam 141 which is engaged is determined by the zone in which the conveyance is travelling at the particular time, the position of the disk 124 on which the cam is mounted having been shifted by the motorman or conductor upon entering the particlar zone as heretobefore described. The pin 141$^a$ on said disk 124 accomplishes the same purpose as the various parts of the cam 141 and is provided for the fifth or last zone. Thus it is apparent that the angle travelled through by the idler pinions 152 and 153 is the same as the angle travelled through by the spring pressed pin 187. This angular relation and also the relation between the various positions of the cam 141 and the spring pressed pin 187 are clearly shown in Figures 31, 32 and 33.

In order that the crank 92 may complete its travel to the left to release the various interlocking mechanisms, particularly the spring actuated pin 198, means are provided for releasing the same after the engagement of the spring pressed pin 187 with the cam or the pin 141$^a$. Said crank is connected to the mutilated gear 143 by means of a spring pressed pin 187$^a$ and after the rotation thereof has been stopped by the engagement of the spring pressed pin 187 with the cam 141 or the pin 141$^a$, said spring pressed pin 187$^a$ engages one of the pins 142 and is released from its engagement with the mutilated gear 143 and the rest of the crank travel to the left is permitted.

If only one series of different sized tokens were used there would be danger of certain persons manufacturing counterfeit tokens and presenting a token which would only require payment of fare for a single zone when in fact they had ridden several zones. In order to prevent this occurring, means are provided whereby the machine may be adjusted daily if necessary and only a certain series of tokens will maintain the proper angular relation for the functioning of the various indicating and totalling mechanisms and so that a token having an aperture of the wrong size will fail to effect a proper functioning of these mechanisms whereby a fraud on the part of the passenger will be readily detected. The arrangement whereby the machine may effectively function with tokens having only a definite size of aperture is shown in Figures 37 and 36. This change is accomplished by shifting the angle of the plate 161 in which the spring pressed pin 165 is mounted on the mutilated gear 149, slightly on said mutilated gear. To accomplish this the set screw 162 is loosened and the pin 163 is removed and placed in another aperture which is provided therefor, whereupon the set screw is tightened and since the angular relation is changed the machine is adapted now to function only with a certain definite series of tokens which has apertures of different sizes than the ones used before the machine was adjusted. While the set screw and pin arrangement just described has been shown herein, it is evident that any suitable mechanism may be used for shifting and locking the plate 161, where it is necessary to make the change frequently.

The rotation of the mutilated gear 147 during the totalling and indicating operation just described also actuates a mechanism 168, 169, 174 and 175, which causes a registration of the operation on a set-back cyclometer 177, which is mounted on the back of the receiving device, as clearly shown in Figure 38. The reading on said cyclometer 177 thus serves to indicate the number of passengers that have left the conveyance and provides, together with the set-back cyclometer 76, a convenient means for checking the number of passengers that should be on the conveyance at any time. This number of course is the difference between the readings of the cyclometers on the issuing and receiving devices respectively.

The amount of fare shown on the indicating disk 119 is paid by the passenger on leaving the conveyance and since said amounts are totalled on the device 181 as they are indicated, the conductor or the person receiving the fares may be held responsible for the total amount of money indicated on said totalling device and at the end of each trip he should have received in cash an amount equal to the difference between the amounts shown on said device 181 at the beginning of the trip and at the end of the trip respectively. The various interlocking mechanisms which have heretofore been described make it imperative that each totalling and indicating operation be separately effected and completed and the machine cleared, or in other words the receiving wheel 104 advanced before a subsequent token may be received and indicated by the device.

While there has been shown and described in this specification an operative construction for the purpose specified, it is evident that said construction may be modified for use in the various adaptations of the zone fare system, and that said modifications, if made, will fall well within the spirit of this invention. It is also apparent that the devices shown and described provide means whereby all of the necessary registering and totalling operations for a zone fare system in which the zones are each represented by a separate token, may be completed.

The system of this invention may also be used on the platforms of railway stations, the tokens being issued before the passenger enters the conveyance and the fare collected after he leaves the same. This adaptation is a particularly desirable one for use in connection with elevated and subway railway lines where the stations are located at zone points.

It is also apparent that the system proposed by this invention is well adapted for use where the mileage system of fare collection is used and it is intended that the broad term "zone systems" used in this specification shall include the same.

We are aware that numerous details of construction may be varied through a wide range without departing from the principles of this invention, and we therefore do not purpose limiting the patent granted otherwise than necessitated by the prior art.

We claim as our invention:

1. A fare collecting system comprising means for issuing metallic tokens indicative of the zone in which the conveyance is travelling at the time of issuance and means for subsequently receiving said metallic tokens and computing the amount of fare to be paid in accordance with the zone in which the conveyance is travelling at the time of the receipt of the tokens, each of said zones being indicated by the physical characteristics of the particular metallic token issued therefor.

2. A fare collecting system comprising means for registering and issuing tokens indicative of the zone in which the conveyance is travelling at the time of issuance, and means for subsequently receiving said token and mechanically computing the amount of fare to be paid in accordance with the zone distance travelled.

3. A fare collecting system comprising means for issuing and registering tokens indicative of the zone in which the conveyance is travelling at the time of issuance, and means for subsequently receiving said tokens, indicating the zone distance travelled, computing the amount of fare to be paid in accordance with said zone distance travelled, indicating said amount on a visible indicator, and totalling the same.

4. A fare collecting system comprising means for issuing a metallic token indicative of the particular zone in which the conveyance is travelling at the time of issuance, and means for subsequently receiving said token, computing the amount of fare to be paid in accordance with the zone distance travelled, and totalling the amount of said computed fare.

5. A fare collecting system comprising means for issuing and registering metallic tokens indicative of the zone in which the conveyance is travelling at the time of issuance, and means for subsequently receiving said token, computing the amount of fare in accordance with the zone distance travelled, and indicating computed fare on a visible indicator.

6. A fare registering installation comprising in combination a device for issuing tokens varying with the zone in which issued, a receiving device therefor, means associated with said devices for registering the tokens issued and received thereby, and means associated with the receiving device for automatically computing the fare to be paid in accordance with the zone distance travelled.

7. A fare registering installation comprising in combination a device for issuing tokens varying with the zone in which issued, a receiving device therefor, means associated with said devices for registering the tokens issued and received thereby, means associated with the receiving device for computing from said tokens the fare to be paid in accordance with the zone distance travelled, and means connecting said issuing and receiving devices to simultaneously adjust the same for the zone in which the conveyance is travelling.

8. A fare registering installation comprising, in combination, a device for issuing tokens varying with the zone in which issued, a receiving device therefor, means associated with said devices for registering the tokens issued and received thereby, electrically controlled means for connecting said devices to simultaneously adjust the same for the zone in which the conveyance is travelling, and means associated with the receiving device for computing from said tokens the fare to be paid in accordance with the zone distance travelled.

9. A fare registering installation comprising in combination a device for issuing tokens varying with the zone in which issued, a receiving device therefore, means for adjusting the same for the zone in which the conveyance is travelling, and registering and indicating mechanisms forming a part of the receiving device and controlled by the tokens received thereby.

10. A fare registering installation for conveyances comprising, in combination, token issuing and receiving devices, means associated therewith for separately registering the tokens issued and received, and token controlled means associated with the receiving device for computing and totalling the amount of fare paid.

11. A token receiving device for zone systems comprising means adapted to receive tokens characteristic of the different zones, mechanisms controlled by said tokens for computing the fare to be paid in accordance with the zone distance travelled, and indicating mechanisms controlled by said computing mechanisms.

12. A token receiving device for zone fare collection systems comprising means adapted to receive tokens characteristic of different zones, token controlled mechanisms for computing the fare to be paid according to the zone distance travelled, fare and zone indicators controlled by said computing mechanism, and a registering mechanism operated by said computing mechanism.

13. A token receiving device for zone fare systems comprising means adapted to receive tokens characteristic of different zones, and mechanisms controlled by said tokens for indicating the zone represented by each token received.

14. A token receiving device for conveyances using the zone fare system comprising in combination mechanisms for indicating the zones in which the conveyance is travelling, means for receiving tokens characteristic of the different zones, and mechanisms controlled by said tokens and by said first mentioned mechanisms for computing the fare to be paid in accordance with the zone distance travelled.

15. A token receiving device for conveyances using the zone fare system comprising, in combination, a mechanism for indicating the zone in which the conveyance is travelling, means for receiving tokens characteristic of different zones, and mechanisms controlled by said tokens and by said first mentioned mechanisms for computing and indicating the fare to be paid in proportion to the distance travelled.

16. A token receiving device for zone systems comprising means adapted to receive tokens characteristic of different zones, mechanisms controlled by said tokens for computing the fares to be paid in accordance with the zone distance travelled, and a fare totalling mechanism operated by said computng mechanisms.

17. A token receiving device for conveyances using the zone fare system comprising, in combination, a mechanism for indicating the zone in which the conveyance is travelling, and "in" and "out" indicator controlled by said mechanism, and a token controlled mechanism associated with said indicator for indicating the zone of which each token received is characteristic.

18. A token receiving mechanism for zone fare systems comprising means adapted to receive tokens characteristic of different zones, manually operable means adapted to engage said tokens, and means controlled by the travel of said manually operable means up to the time that the same engages the token for indicating the zone of which the token received is characteristic.

19. A token receiving device for a zone fare system comprising means adapted to receive tokens characteristic of different zones, manually operable means adapted to engage said tokens, and means controlled by the travel of said manually operable means subsequent to the time that the same engages the token for computing and indicating the amount of fare to be paid in accordance with the zone distance travelled.

20. A token receiving device for zone systems comprising means adapted to receive tokens characteristic of different zones, mechanisms controlled by said tokens for computing the fare to be paid in accordance with the zone distance travelled, and means for locking said receiving means against movement during the computing operation.

21. A token receiving device comprising means adapted to receive a series of tokens of different characteristics, token controlled computing mechanisms associated with said receiving means, and means for adjusting said receiving means so that the operation of the computing mechanisms may be effected in accordance with the individual characteristics of the different tokens.

22. A token receiving device for conveyances using the zone fare system comprising a frame, token receiving means mounted thereon, adjustable means for indicating the zone in which the conveyance is travelling, a cam on said means, a computing mechanism adaptable to engage the token and the cam at different times, and a fare indicating mechanism controlled by the movement of the computing mechanism between said engagements.

23. A device of the class described comprising a frame, token receiving means mounted thereon, a token controlled computing mechanism associated with said receiving means, actuating means for said computing mechanism, a totalling mechanism operated by the computing mechanism, and an interlocking means for the totalling mechanism associated with the actuating means.

24. A device of the class described comprising a frame, token receiving means mounted thereon, a token controlled computing and indicating mechanism associated with said receiving means, actuating means for said computing and indicating means, a totalling mechanism operated by the computing mechanism, and a token controlled interlocking device for the totalling mechanism associated with the actuating means.

25. A token receiving device for zone systems comprising token conveying and receiving means adapted to receive tokens characteristic of different zones, and mechanism controlled by said tokens for computing the fare to be paid according to the zone distance travelled.

26. A system for computing and registering fares employing conjunctively, means such as tokens having differentiating characteristics whereby respective zones and stages are designated, and apparatus having mechanism capable of being set or adjusted relatively to the zone and stages and operated through the medium of said tokens in accordance with the individual characteristics thereof to automatically compute and register varying fare values.

27. A fare collecting system comprising mechanism adapted to issue tokens of different physical characteristics, mechanism adapted to receive a token as the passenger leaves and means in said mechanism for registering the correct fare the passenger has to pay, said means being governed by the physical characteristic of the token.

In testimony whereof, we have hereunto subscribed our names.

HUGO J. BAUR.
ERNEST H. THOMPSON.